(12) United States Patent
Hong et al.

(10) Patent No.: US 10,224,611 B2
(45) Date of Patent: Mar. 5, 2019

(54) ANTENNA AND ELECTRONIC DEVICE INCLUDING THE SAME

(71) Applicant: Samsung Electronics Co., Ltd., Gyeonggi-do (KR)

(72) Inventors: Sang Ho Hong, Gyeonggi-do (KR); Mu Chang Son, Gyeonggi-do (KR); Sung Chul Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 62 days.

(21) Appl. No.: 15/625,425

(22) Filed: Jun. 16, 2017

(65) Prior Publication Data

US 2017/0365914 A1 Dec. 21, 2017

(30) Foreign Application Priority Data

Jun. 16, 2016 (KR) ........................ 10-2016-0075156

(51) Int. Cl.
| | |
|---|---|
| *H01Q 1/24* | (2006.01) |
| *H01Q 3/24* | (2006.01) |
| *H01Q 5/50* | (2015.01) |
| *H01Q 1/38* | (2006.01) |
| *H04B 7/08* | (2006.01) |

(Continued)

(52) U.S. Cl.
CPC ............. *H01Q 1/243* (2013.01); *H01Q 1/38* (2013.01); *H01Q 3/24* (2013.01); *H01Q 5/50* (2015.01); *H01Q 21/28* (2013.01); *H04B 7/0602* (2013.01); *H04B 7/0802* (2013.01); *H04B 7/0805* (2013.01); *H04B 7/12* (2013.01); *H04L 5/14* (2013.01); *H01Q 9/42* (2013.01)

(58) Field of Classification Search
CPC ............ H01Q 1/38; H01Q 1/24; H01Q 1/243; H01Q 5/50; H01Q 21/28; H01Q 21/30; H01Q 3/24; H01Q 5/335; H01Q 9/42; H04B 7/0805; H04B 7/12; H04B 1/0053; H04B 1/0064; H04B 7/0602; H04B 7/0802; H04B 7/0871
See application file for complete search history.

(56) References Cited

U.S. PATENT DOCUMENTS 9,123,990 B2 9/2015 Ramachandran et al.
9,362,958 B2 6/2016 Gudem et al.
(Continued)

FOREIGN PATENT DOCUMENTS

KR 1020160012571 2/2016

OTHER PUBLICATIONS

International Search Report dated Oct. 26, 2017 issued in counterpart application No. PCT/KR2017/006359, 3 pages.

*Primary Examiner* — Tho G Phan
(74) *Attorney, Agent, or Firm* — The Farrell Law Firm, P.C.

(57) ABSTRACT

Disclosed is an electronic device including a first antenna element configured selectively to receive signals of a first frequency band and a second frequency band or of the first frequency band and a third frequency band, a second antenna element configured to receive a signal of the third frequency band, a transceiver configured to be electrically connected with the first antenna element and the second antenna element, and a processor configured to be electrically connected with the transceiver. The electronic device performs carrier aggregation using the second frequency band and the third frequency band.

20 Claims, 16 Drawing Sheets

(51) Int. Cl.
*H04B 7/12* (2006.01)
*H04L 5/14* (2006.01)
*H01Q 21/28* (2006.01)
*H04B 7/06* (2006.01)
*H01Q 9/42* (2006.01)

(56) References Cited

U.S. PATENT DOCUMENTS

| | | | |
|---|---|---|---|
| 9,590,717 B2 * | 3/2017 | Kim | H04B 7/082 |
| 9,705,534 B2 | 7/2017 | Kim et al. | |
| 9,722,639 B2 | 8/2017 | Khlat et al. | |
| 9,853,355 B2 * | 12/2017 | Choi | H01Q 1/44 |
| 9,853,698 B2 * | 12/2017 | Khlat | H04B 7/0413 |
| 9,865,922 B2 * | 1/2018 | Kerr | H01Q 5/328 |
| 9,985,351 B2 * | 5/2018 | Kim | H01Q 5/335 |
| 2013/0088404 A1 | 4/2013 | Ramachandran et al. | |
| 2013/0231064 A1 | 9/2013 | Gudem et al. | |
| 2014/0328220 A1 | 11/2014 | Khlat et al. | |
| 2015/0318975 A1 | 11/2015 | Lim et al. | |
| 2016/0028157 A1 | 1/2016 | Kim et al. | |
| 2016/0065247 A1 | 3/2016 | Kim et al. | |
| 2016/0276748 A1 * | 9/2016 | Ramachandran | H01Q 21/28 |
| 2017/0163323 A1 * | 6/2017 | Xiong | H01Q 5/50 |

* cited by examiner

ANTENNA AND ELECTRONIC DEVICE INCLUDING THE SAME

PRIORITY

This application claims priority under 35 U.S.C. § 119(a) to a Korean Patent Application filed in the Korean Intellectual Property Office on Jun. 16, 2016 and assigned Serial Number 10-2016-0075156, the contents of which are incorporated herein by reference.

BACKGROUND

1. Field of the Disclosure

The present disclosure relates generally to an electronic device, and more particularly, to technologies for performing carrier aggregation (CA) using a plurality of antennas included in an electronic device.

2. Description of the Related Art

An electronic device such as a smartphone or a tablet may communicate with a network using an antenna. Contrary to $3^{rd}$ generation partnership project (3G) in which a few frequency bands, such as 900 MHz, 1.8 GHz, or 2.1 GHz are globally used, a long term evolution (LTE) or LTE-advanced (LTE-A) network proceeding 3G may use a variety of frequency bands for each country and/or each mobile network operator (MNO).

According to Tables 5.5-1 "E-UTRA Operating Bands" of 3GPP TS 36.101, there may be 30 or more frequency bands currently commercialized. Thus, one or more antenna devices which cover many frequency bands to support networks of a variety of countries and MNOs may be loaded into each of recently released electronic devices.

Technologies for increasing quality or download speeds of signals received from a network, such as carrier aggregation (CA) or reception (Rx) diversity, may be applied to electronic devices.

However, an electronic device such as a smartphone or a tablet may have a loading space insufficient to load each of antennas for communicating with frequency bands. Since antennas such as coils for a global positioning system (GPS), Bluetooth®, wireless fidelity (Wi-Fi), near field communication (NFC), or magnetic stripe transmission (MST), wireless charging other than an LTE network are loaded into each of electronic devices, causing an excessive antenna design for supporting the cellular network. Thus, a general antenna radiator may be designed to cover a low band (LB) and a mid-band (MB) together and/or cover an LB and an (HB) together, although some loss occurs in efficiency (Rx performance) of the antenna.

In another example, a radiator which covers all of an LB, MB, and HB may be designed, but an antenna using this radiator may have several problems such as in Rx performance and isolation of signals. For example, since a signal of an MB and an HB is relatively adjacent in a frequency range, it is difficult to isolate frequencies using a diplexer and an insertion loss is increased.

Meanwhile, to support inter-band CA, an antenna should be able to simultaneously receive signals which belong to different frequency bands. According to the above-mentioned general antenna design, if an antenna is implemented by switching an MB and an HB, inter-band CA performance may fail. Alternatively, if the switching is not performed, performance of the antenna may be compromised and an effect of CA may be minimal due to addition of components for classifying the MB and the HB.

Particularly, if transmission (Tx) and reception (Rx) signal schemes of the MB and the HB differ from each other, such as if CA of frequency division duplex (FDD) band 1 and time division duplex (TDD) band 41 is performed, CA performance may be degraded. Alternatively, if an HB used for CA is not covered by a conventional antenna radiator, CA performance is degraded. For example, if a conventional antenna covers up to 2400 megahertz (MHz) and a signal of band 7 having a downlink bandwidth of 2620 to 2690 MHz is received for CA, the performance of the inter-band CA is degraded by the conventional antenna design.

As such, there is a need in the art for an antenna design that prevents degradation of the conventional antenna

SUMMARY

Aspects of the present disclosure address at least the above-mentioned problems and/or disadvantages and provide at least the advantages described below. Accordingly, an aspect of the present disclosure is to implement inter-band CA using a separate antenna.

In accordance with an aspect of the present disclosure, an electronic device includes a first antenna element configured to selectively receive signals of a first frequency band and a second frequency band or to receive signals of the first frequency band and a third frequency band, a second antenna element configured to receive a signal of the third frequency band, a transceiver configured to be electrically connected with the first antenna element and the second antenna element, and a processor configured to be electrically connected with the transceiver, wherein, if a network supports carrier aggregation (CA) using the second frequency and the third frequency band, the processor enables the first antenna element to receive the signals of the first frequency band and the second frequency band, enables the second antenna element to receive the signal of the third frequency band, and enables the transceiver to perform CA using the signal of the second frequency band and the signal of the third frequency band.

In accordance with another aspect of the present disclosure, an electronic device includes a first antenna element, a first switch configured to enable the first antenna element to receive a signal of a first frequency band and a second frequency or receive a signal of the first frequency band and a third frequency band, a second antenna element configured to receive a signal of the third frequency band, a first RF block configured to process a signal of the first frequency band, a second RF block configured to process a signal of the second frequency band, a third RF block configured to process the signal of the third frequency band, a second switch configured to connect the first antenna element with the second RF block or the third RF block according to a connection of the first switch and connect the second antenna element with third RF block according to whether a network supports CA, a transceiver configured to be connected with the first RF block, the second RF block, and the third RF block, and a processor configured to be electrically connected with the transceiver, wherein, if the network supports CA, the processor may control the first switch such that the first antenna element receives the signal of the first frequency band and the second frequency band, may control the second switch to connect the first antenna element with the second RF block and connect the second antenna element with the third RF block, and may enable the transceiver to perform CA using the signal of the second frequency band and the signal of the third frequency band.

Other aspects, advantages, and salient features of the disclosure will become apparent to those skilled in the art from the following detailed description, which, taken in conjunction with the annexed drawings, discloses embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
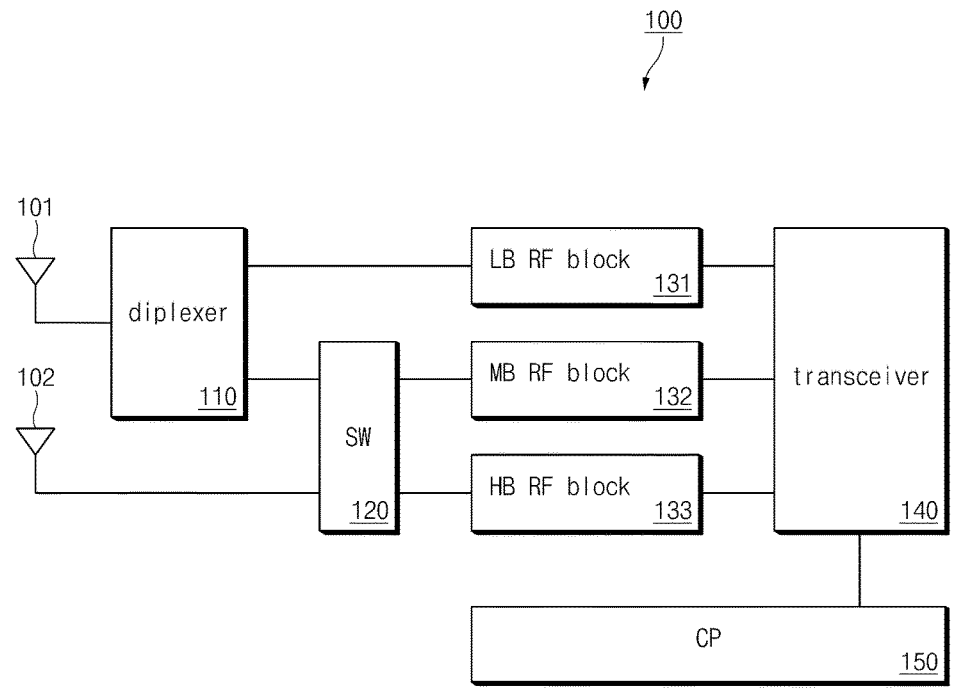
FIG. 1 illustrates an antenna structure of an electronic device according to an embodiment of the present disclosure.

Embodiments of the present disclosure will be described with reference to accompanying drawings. Accordingly, those of ordinary skill in the art will recognize that modification, equivalent, and/or alternative on the embodiments described herein can be made without departing from the scope and spirit of the present disclosure. With regard to description of drawings, similar elements may be marked by similar reference numerals.

In this disclosure, the expressions "have", "may have", "include" and "comprise", or "may include" and "may comprise" indicate the existence of corresponding features, such as numeric values, functions, operations, or components, but do not exclude presence of additional features.

In this disclosure, the expressions "A or B", "at least one of A or/and B", or "one or more of A or/and B" may include any and all combinations of one or more of the associated listed items. For example, the expression "A or B", "at least one of A and B", or "at least one of A or B" may refer to any of (1) when at least one A is included, (2) when at least one B is included, and (3) when both of at least one A and at least one B are included.

Terms, such as "first" and "second" used in this disclosure may refer to various elements regardless of the order and/or the priority and to distinguish the relevant elements from other elements, but do not limit the elements. For example, "a first user device" and "a second user device" indicate different user devices regardless of the order or priority, a first element may be referred to as a second element, and similarly, a second element may be referred to as a first element.

It will be understood that when an element, such as a first element, is referred to as being "operatively or communicatively coupled with/to" or "connected to" another element, such as a second element), the first element may be directly coupled with/to or connected to the second element or an intervening element, such as a third element, may be present. In contrast, when the first element) is referred to as being "directly coupled with/to" or "directly connected to" the second element, it should be understood that there is no intervening third element.

According to the situation, the expression "configured to" used in this disclosure may be interchangeably used with the expressions "suitable for", "having the capacity to", "designed to", "adapted to", "made to", or "capable of". The term "configured to" does not indicate only "specifically designed to" in hardware, but the expression "a device configured to" may indicate that the device is "capable of" operating together with another device or other components. For example, a "processor configured to (or set to) perform A, B, and C" may indicate an embedded processor for performing a corresponding operation or a generic-purpose processor, such as a central processing unit (CPU) or an application processor, which performs corresponding operations by executing one or more software programs which are stored in a memory device.

Terms used in this disclosure are used to describe specified embodiments and are not intended to limit the scope of another embodiment of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as being customary in the relevant related art and not in an idealized or overly formal manner unless expressly so defined in embodiments of this disclosure. In some cases, even terms which are defined in this disclosure may not be interpreted to exclude embodiments of this disclosure.

An electronic device according to embodiments of this disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, mobile medical devices, cameras, or wearable devices. The wearable device may include at least one of an accessory type, such as watches, rings, bracelets, anklets, necklaces, glasses, contact lens, or head-mounted-devices (HMDs), a fabric or garment-integrated type, such as electronic apparel, a body-attached type, such as a skin pad or tattoos, or a bio-implantable type, such as an implantable circuit.

According to embodiments, the electronic device may be a home appliance including at least one of televisions (TVs), digital versatile disc (DVD) players, audios, refrigerators, air conditioners, cleaners, ovens, microwave ovens, washing machines, air cleaners, set-top boxes, home automation control panels, security control panels, TV boxes, such as Samsung HomeSync™, Apple TV™, or Google TV™, game consoles, such as Xbox™ or PlayStation™, electronic dictionaries, electronic keys, camcorders, and electronic picture frames.

According to another embodiment, an electronic device may include at least one of various medical devices, such as a blood glucose monitoring device, a heartbeat measuring device, a blood pressure measuring device, or a body temperature measuring device, a magnetic resonance angiography (MRA), a magnetic resonance imaging (MRI) device, a computed tomography (CT) device, scanners, and ultrasonic devices, navigation devices, global navigation satellite system (GNSS) device, event data recorders (EDRs), flight data recorders (FDRs), vehicle infotainment devices, electronic equipment for vessels, such as navigation systems and gyrocompasses, avionics, security devices, head units for vehicles, industrial or home robots, automated teller machines (ATMs), points of sales (POSs) devices, or Internet of Things (IoT) devices, such as light bulbs, various sensors, electric or gas meters, sprinkler devices, fire alarms, thermostats, street lamps, toasters, exercise equipment, hot water tanks, heaters, and boilers.

According to an embodiment, the electronic device may include at least one of parts of furniture or buildings/structures, electronic boards, electronic signature receiving devices, projectors, and various measuring instruments, such as water meters, electricity meters, gas meters, or wave meters. The electronic device may be one of the above-described devices or a combination thereof, and may be a flexible electronic device, may not be limited to the above-described electronic devices and may include other electronic devices and new electronic devices according to the development of new technology.

In the present disclosure, a frequency band may refer to a band defined in the 3$^{rd}$ generation partnership project (3GPP). A bandwidth may indicate an uplink/downlink frequency range of a frequency band. An uplink frequency range may be distinguished from a downlink frequency range in a frequency division duplex (FDD) scheme, but an uplink frequency range may be the same as a downlink frequency range in a time division duplex (TDD) scheme. Each frequency band may be classified as a low frequency band (low-band) (LB), a middle frequency band (mid-band) (MB), or a high frequency band (high-band) (HB) depending on a used bandwidth. For example, according to the 3GPP band definition, each band may be classified into three groups, such as the LB, MB, and HB in Table 1 below, depending on an assigned bandwidth.

TABLE 1

| Band No. | Band Definition | Uplink Frequency Range | Downlink Frequency Range | FDD/TDD |
|---|---|---|---|---|
| 1 | MB | 1920-1980 | 2110-2170 | FDD |
| 2 | MB | 1850-1910 | 1930-1990 | FDD |
| 3 | MB | 1710-1785 | 1805-1880 | FDD |
| 4 | MB | 1710-1755 | 2110-2155 | FDD |
| 5 | LB | 824-849 | 869-894 | FDD |
| 7 | HB | 2500-2570 | 2620-2690 | FDD |
| 8 | LB | 880-915 | 925-960 | FDD |
| 9 | MB | 1749.9-1784.9 | 1844.9-1879.9 | FDD |

TABLE 1-continued

| Band No. | Band Definition | Uplink Frequency Range | Downlink Frequency Range | FDD/TDD |
|---|---|---|---|---|
| 10 | MB | 1710-1770 | 2110-2170 | FDD |
| 11 | MB | 1427.9-1452.9 | 1475.9-1500.9 | FDD |
| 12 | LB | 698-716 | 728-746 | FDD |
| 13 | LB | 777-787 | 746-756 | FDD |
| 14 | LB | 788-798 | 758-768 | FDD |
| 17 | LB | 704-716 | 734-746 | FDD |
| 18 | LB | 815-830 | 860-875 | FDD |
| 19 | LB | 830-845 | 875-890 | FDD |
| 20 | LB | 832-862 | 791-821 | FDD |
| 21 | MB | 1447.9-1462.9 | 1495.9-1510.9 | FDD |
| 25 | MB | 1850-1915 | 1930-1995 | FDD |
| 26 | LB | 814-849 | 859-894 | FDD |
| 28 | LB | 703-748 | 758-803 | FDD |
| 33 | MB | 1900-1920 | 1900-1920 | TDD |
| 38 | HB | 2570-2620 | 2570-2620 | TDD |
| 39 | MB | 1880-1920 | 1880-1920 | TDD |
| 40 | HB | 2300-2400 | 2300-2400 | TDD |
| 41 | HB | 2496-2690 | 2496-2690 | TDD |
| 44 | LB | 703-803 | 703-803 | TDD |

Each band may be categorized as a first frequency band having a bandwidth which belongs to a first frequency band, a second frequency band having a bandwidth which belongs to a second frequency band, or a third frequency band having a bandwidth which belongs to a third frequency band. Herein, the second frequency band may be defined to be greater than a maximum value of the first frequency range and less than a minimum value of the third frequency range. In an embodiment, the first frequency band, the second frequency band, and the third frequency band may respectively correspond to LB, MB, and HB defined in the 3GPP. However, the first frequency band, the second frequency band, and the third frequency band may be defined to differ from the 3GPP. For example, a band using a frequency of 2000 MHz or more may be defined as the third frequency band.

In the present disclosure, for convenience of description, the first frequency band may be understood as LB, the second frequency band may be understood as MB, and the third frequency band may be understood as HB. For example, the LB may be about 700 to 900 MHz, the MB may be 1.4 to 2.2 GHz, and the HB may be 2.3 to 2.7 GHz. However, different criteria than in the above example or the 3GPP standards may be provided, such as categorization into four or more frequency bands.

Hereinafter, electronic devices according to embodiments will be described with reference to the accompanying drawings. In this disclosure, the term "user" may refer to a person who uses an electronic device or to an artificial intelligence electronic device that uses the electronic device.

FIG. 1 illustrates an antenna structure of an electronic device according to an embodiment of the present disclosure.

Referring to FIG. 1, an electronic device 100 may be a mobile device used by a user, and may also be referred to as a mobile terminal, or a user equipment (UE).

The electronic device 100 may include a first antenna element 101, a second antenna element 102, a diplexer 110, a switch (SW) 120, an LB radio frequency (RF) block 131, an MB RF block 132, an HB RF block 133, a transceiver 140, and a communication processor (CP) 150.

The electronic device 100 shown in FIG. 1 may further include additional elements such as an application processor (AP), a memory, a display, a touch integrated circuit (IC), a camera, a microphone, a speaker, and a variety of sensors.

The first antenna element 101 may include one or more radiators. In an embodiment, the first antenna element 101 may include a radiator which may have a plurality of electrical paths, by being bent or extended from a point. In another embodiment, the first antenna element 101 may be implemented with two or more radiators. The first antenna element 101 may selectively receive a signal of a first frequency band, such as (LB, and a signal of a second frequency band, such as MB, or the signal of the first frequency band and a signal of a third frequency band, such as HB, through a plurality of electrical paths. A description will be given of a configuration of the first antenna element 101 with reference to FIGS. 2A, 2B and 2C.

The second antenna element 102 may include a radiator for receiving a signal of a specific frequency band for CA. For example, the second antenna element 102 may include a radiator for receiving a signal corresponding to band 41 to perform band 1-band 41 CA, wherein a signal corresponding to band 1 may be received by the first antenna element 101.

The diplexer 110 may be understood as a filter circuit including one or more filters, and may be replaced with another filter circuit such as a triplexer. The diplexer 110 may divide a signal received via the first antenna element 101 into two frequency bands. For example, if a signal including an LB and an HB is received via the first antenna element 101, the diplexer 110 may be implemented to transmit an LB component in the signal to the LB RF block 131 and transmit an HB component in the signal to the HB RF block 133.

The SW 120 may be implemented to selectively transmit part of a signal, such as an MB or an HB signal, received via the first antenna element 101 to the MB RF block 132 or the HB RF block 133. For example, the SW 120 may connect the first antenna element 101 to the MB RF block 132 via the diplexer 110, or may connect the first antenna element 101 to the HB RF block 133 via the diplexer 110.

The SW 120 may connect a signal received via the second antenna element 102 with the MB RF block 132 or the HB RF block 133, such as only if a CA or diversity function is enabled. In other words, the SW 120 may be implemented with a double pole double throw (DPDT) switch.

The LB RF block 131, the MB RF block 132, and the HB RF block 133 may be understood as a first RF block, a second RF block, and a third RF block, respectively. Each RF block may include a switch, a duplexer, and a power amplifier. For example, the first antenna element 101 may receive a lower frequency signal corresponding to 500 to 900 MHz. If the electronic device 100 supports LTE band 5 (869 to 894 MHz), a switch of the LB RF block 131 may be configured such that a signal received via the first antenna element 101 is introduced into a signal path corresponding to LTE band 5.

If the electronic device 100 should receive a signal of an LTE band 14 (758 to 768 MHz), such as when a country or a mobile network operator (MNO) is changed, the switch of the LB RF block 131 may be configured such that a signal received via the first antenna element 101 is introduced into a signal path corresponding to LTE band 14.

Each of the RF blocks may be electrically connected with the transceiver 140, and the transceiver 140 may be electrically connected with a CP 150 which controls settings of an antenna directly or via the transceiver 140.

Figure 2A:
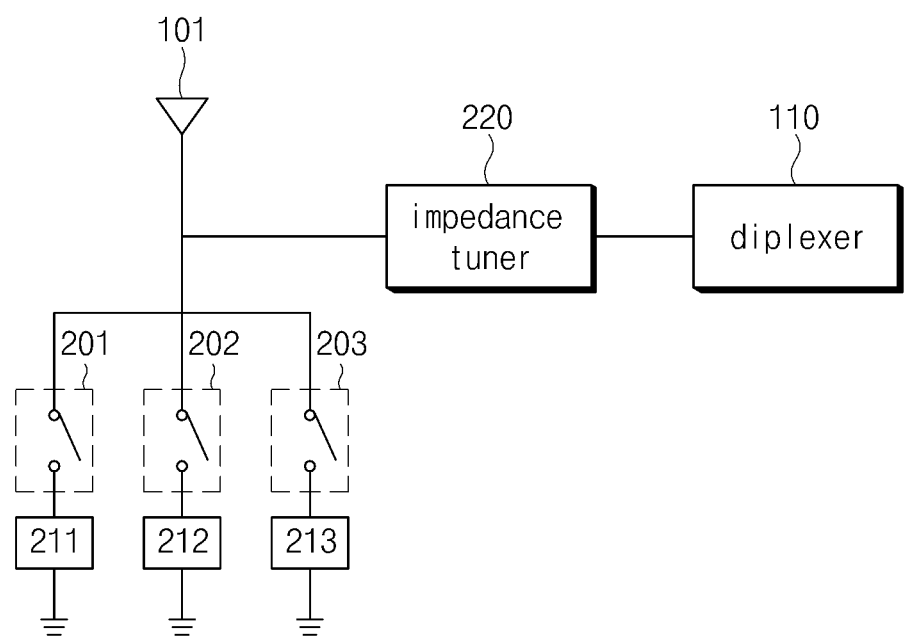
FIGS. 2A, 2B, and 2C illustrate an example of an antenna structure according to embodiments.
Figure 2B:
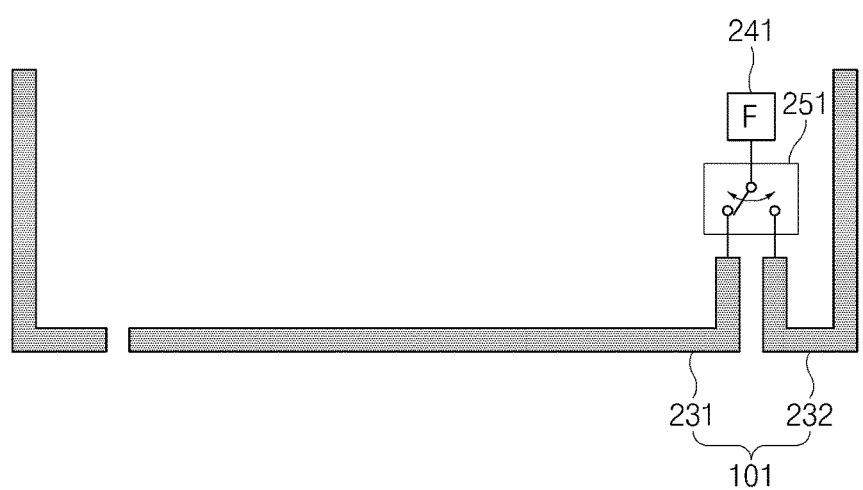
Figure 2C:
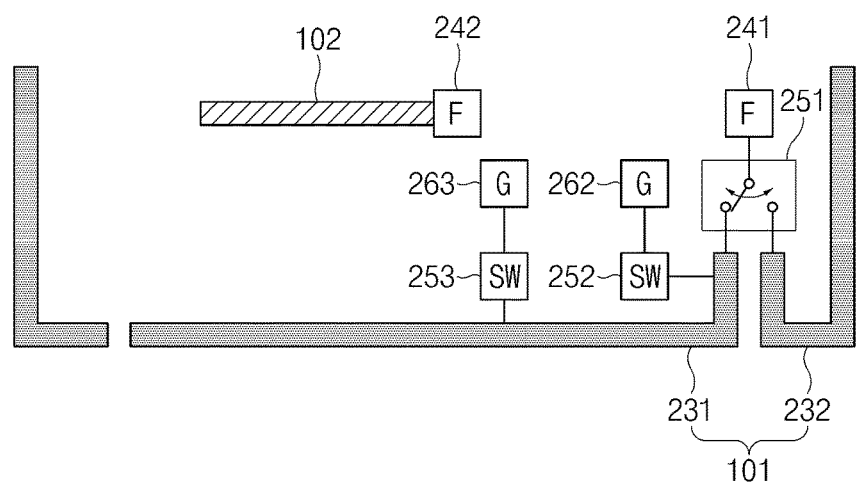

FIGS. 2A, 2B and 2C illustrate an example of an antenna structure according to embodiments of the present disclosure. Herein, the antenna structure shown in FIGS. 2A, 2B and 2C may be an example, and a variety of examples may be modified by those skilled in the art.

Referring to FIG. 2A, a ground location of a first antenna element 101 may be changed in various manners. For example, the first antenna element 101 may be connected to ground at a first location via a switch 201 and a matching circuit 211, and may be connected to ground at a second location via a switch 202 and a matching circuit 212 or may be connected to ground at a third location via a switch 203 and a matching circuit 213. A CP 150 of FIG. 1 may control the switches 201 to 203 in a suitable manner depending on a frequency band of a signal to be received to change a ground location of the first antenna element 101. In another example, a ground location may be implemented as two ground locations or four or more ground locations.

An impedance tuner 220 may be located between the first antenna element 101 and a diplexer 110. The impedance tuner 220 may include at least one (variable) lumped element. An electronic device 100 of FIG. 1 may control a signal received from the first antenna element 101 by adjusting a value of the lumped element.

Referring to FIG. 2B, the first antenna element 101 may include a first radiator 231 and a second radiator 232, which may correspond to part of a housing of the electronic device 100. For example, a side of the electronic device 100 may be implemented with a metal housing (or a bezel) that may be segmented by insulating materials at a plurality of points. For example, an insulating material or a dielectric substance may be located in a separated space between the first radiator 231 and the second radiator 232, which may configure a side housing at a lower end of the electronic device 100. A side housing of a symmetric structure may be arranged at an upper end of the electronic device 100. A description will be given of an example of a structure associated with this with reference to FIG. 6.

The first radiator 231 and the second radiator 232 may have different electrical lengths. For example, as illustrated, the first radiator 231 may be longer in length than the second radiator 232. A switch 251 may be arranged between a feeding unit (F) 241 and the first and second radiators 231 and 232. If the feeding unit 241 is connected with the first radiator 231 via the switch 251, the electronic device 100 may receive a signal of a frequency band corresponding to an electrical length of the first radiator 231. In this case, the second radiator 232 may be electrically coupled with the first radiator 231. A signal of a frequency band corresponding to an electrical length including the first radiator 231 and the second radiator 232 may be received. This signal may correspond to a signal of a frequency band which is relatively lower than that of a frequency band corresponding to an electrical length of the first radiator 231. In other words, if power is fed to the first radiator 231, an LB and MB signal may be received.

If the feeding unit 241 is connected with the second radiator 232 via the switch 251, the electronic device 100 may receive a signal of a frequency band corresponding to an electrical length of the second radiator 232. This signal may correspond to a signal of a higher frequency band than a frequency band corresponding to an electrical length of the first radiator 231. Similar to the above description, the first radiator 231 may be electrically coupled with the second radiator 232. A signal of a frequency band corresponding to an electrical length including the first radiator 231 and the second radiator 232 may be received. In other words, if power is fed to the first radiator 231, an LB and HB signal may be received.

Each of the first radiator 231 and the second radiator 232 may be extended from one point to an inner side of the electronic device 100. Portions extended from each radiator to the inner side may be located to be adjacent to each other to provide an area for capacitive coupling feed. Power is fed via the switch 251 from one end of the portion extended from each radiator to the inner side.

A CP 150 of FIG. 1 may control the switch 251 according to a frequency used for communication. For example, the CP 150 may control the switch 251 such that the electronic device 100 receives all of frequency signals of a plurality of carriers, such as a primary component carrier (PCC) and a secondary component carrier (SCC), upon a CA operation, so that power is fed to the first radiator 231 or the second radiator 232.

FIG. 2C illustrates an example in which the second antenna element 102 is added to the antenna structure of FIG. 2B. Referring to FIG. 2C, the electronic device 100 may feed power to the first radiator 231 of the first antenna element 101 and may receive an LB and MB signal. If the electronic device 100 wants to perform CA of band 1 (2110 to 2170 MHz, FDD) which belongs to the MB and band 41 (2496 to 2690 MHz, TDD) which belongs to the HB, the performance of transmitting and receiving a signal of the HB may be degraded. If the electronic device 100 feeds power to the second radiator 232, the performance of transmitting and receiving a signal of the MB may be degraded. If the first antenna element 101 operates to receive an LB or MB signal, the CP 150 may receive a signal corresponding to band 41 by feeding power to the second antenna element 102 via a feeding unit 242. In other words, the CP 150 may control the switch 120 to connect the second antenna element 102 with an HB RF block 133 such that a transceiver 140 of FIG. 1 may perform CA of the MB and HB signals.

The second antenna element 102 may be located on a sub-printed circuit board (PCB) located at a lower end of the electronic device 100. In this case, the main PCB may be located on an upper end of the electronic device 100, and the main PCB and the sub-PCB may be electrically connected with each other. In an embodiment, the second antenna element 102 may be implemented as a flexible PCB (FPCB). The FPCB corresponding to the second antenna element 102 may be located on the sub-PCB. The second antenna element 102 may be implemented on the main PCB and may correspond to part of a metal housing of the electronic device 100.

Referring to FIG. 2C, the first antenna element 101 may be connected to ground (G) at a plurality of different locations, such as at a first ground location 262 and/or a second ground location 263, by controlling a switch 252 and a switch 253.

Referring back to FIG. 1, an antenna of the electronic device 100 may include the first antenna element 101 and the second antenna element 102. The first antenna element 101 may be connected to the LB RF block 131 and the MB/HB RF block 132/133 via a filter circuit such as the diplexer 110. The CP 150 may switch a signal to be received via the first antenna element 101 according to whether a network supports specified inter-band CA. For example, the CP 150 may control the switch 251 such that the feeding unit 241 is connected with the first radiator 231 or the second radiator 232 in FIG. 2B. If MB-HB CA is performed, the CP 150 may control the switch 251 such that the first antenna element 101 receives MB and HB signals. The CP 150 may control the switch 120 to connect an MB signal received via the first antenna element 101 with the MB RF block 132 or to connect an HB signal received via the second antenna element 102 with the HB RF block 133. If a specified condition is met only if the above-mentioned MB-HB CA is operated, power may be fed to the second antenna element 102.

Figure 3:
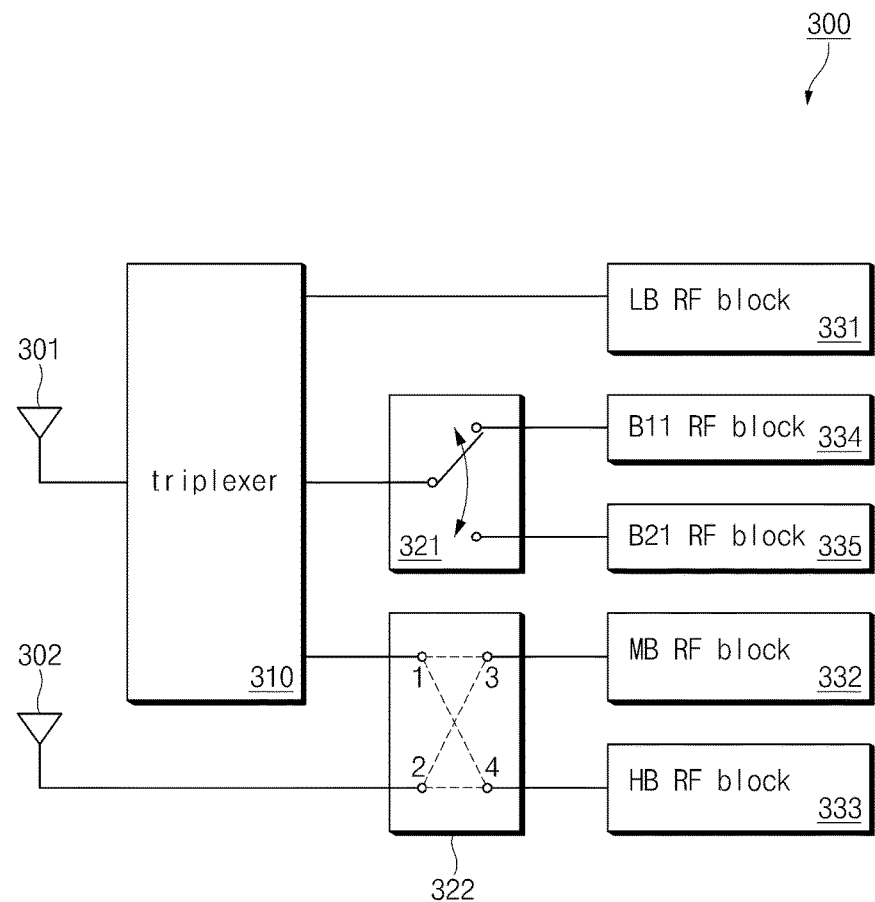
FIG. 3 illustrates an antenna structure of an electronic device according to another embodiment of the present disclosure.

FIG. 3 illustrates an antenna structure of an electronic device according to another embodiment of the present disclosure.

An electronic device 300 shown in FIG. 3 may be understood as a modification of some of elements of an electronic device 100 shown in FIG. 1. Thus, the illustration and description of elements described above in relation to the electronic device 100 will be omitted below.

The electronic device 300 may include a first antenna element 301, a second antenna element 302, a triplexer 310, a first switch 321, a second switch 322, an LB RF block 331, an MB RF block 332, an HB RF block 333, a B11 RF block 334, and a B21 RF block 335. The electronic device 300 may include a transceiver 140 and a communication processor 150 described with reference to FIG. 1.

The first antenna element 301 may correspond to a first antenna element 101 of FIG. 1, and may have a structure of receiving a signal of band 11 and/or 21 or receiving a signal a band 11 frequency band (1475.9 to 1500.9 MHz) and a band 21 frequency band (1495.5 to 1510.9 MHz) to perform CA using the signal of band 11 and/or 21.

The second antenna element 302 may correspond to a second antenna element 102 of FIG. 1, and may operate only upon a specific inter-band CA.

The triplexer 310 may classify a signal received from the first antenna element 301 as an LB, an MB, or an HB may be implemented or replaced with a plurality of diplexers. For example, the electronic device 300 may isolate an LB signal using a first diplexer and may isolate an MB and HB signal using a second diplexer.

The LB RF block 331, the MB RF block 332, and the HB RF block 333 may correspond to the LB RF block 131, the MB RF block 132, and the HB RF block 133 of FIG. 1, respectively. The electronic device 300 may additionally have a circuit for transmitting and receiving a signal of 1.4 to 1.6 GHz in an MB signal. For example, the B11 RF block 334 may be configured with a circuit for processing a signal of band 11. The B21 RF block 335 may be configured with a circuit for processing a signal of band 21. In the electronic device 300 of FIG. 3, the MB RF block 332 may transmit and receive a signal of a 1.6 to 2 GHz band. The first switch 321 may connect a signal provided from the triplexer 310 to the B11 RF block 334 or the B21 RF block 335 depending on network settings. The electronic device 300 may simultaneously transmit and receive a signal of a 1.4 to 1.6 GHz band and a signal of an 1.6 to 2 GHz band in an MB using the configuration. For example, the electronic device 300 may perform CA using a signal of band 11 or 21 and a signal corresponding to an MB of another band which may be obtained from an MB RF block 332. The second switch 322 may correspond to a switch 120 of FIG. 1. Specifically, the second switch 322 may have four ports 1 to 4. Hereinafter, a description will be given of a connection of the second switch 322 depending on whether CA is not performed (a non-CA operation), CA in a frequency band is performed (an intra-band CA operation), and CA between frequency bands is performed (an inter-band CA operation).

1) Non-CA Operation/Intra-Band CA Operation

If the first antenna element 301 receives a signal of a first frequency band (LB) and a second frequency band (MB), the second switch 322 may connect port 1 with port 3. Port 2 is not connected with any port. In other words, the second antenna element 302 may be in a disabled state. Since intra-band CA is a combination of two or more component carriers (CCs) in the same band, intra-band CA may have the same connection state as non-CA. In such a connection state, a signal of a second frequency band may be transmitted to a transceiver via the MB RF block 332.

Similarly, if the first antenna element 301 receives a signal of the first frequency band (LB) and a third frequency band (HB), the second switch 322 may connect port 1 with port 4. Port 2 is not connected with any port. In such a connection state, the signal of the third frequency band may be transmitted to the transceiver via an HB RF block 333.

2) Inter-Band CA Operation

For example, if band 1-band 41 CA is performed, the first antenna element 301 receives a band 1 signal and the second antenna element 302 receives a band 41 signal. The second switch 322 may connect port 1 with port 3 and may connect port 2 with port 4. In this case, the band 1 signal may be transmitted to the transceiver via the MB RF block 332, and the band 41 signal may be transmitted to the transceiver via the HB RF block 333. The transceiver may perform CA using the received band 1 and band 41 signals.

In an embodiment, after the first antenna element 301 receives an HB signal and the second antenna element 302 receives an MB signal, if CA is performed, the second switch 322 may connect port 1 with port 4 and may connect port 2 with port 3. In this case, the HB signal received via the first antenna element 301 may be transmitted to the transceiver via the HB RF block 333, and the MB signal received via the second antenna element 302 may be transmitted to the transceiver via the MB RF block 332. The transceiver may perform MB-HB CA using the received signal. In other words, according to an embodiment disclosed in the present disclosure, a manufacturer of the electronic devices 100 and 300 may load a separate antenna element for implementing specific CA such that the separate antenna element is controlled via a switch.

Figure 4:
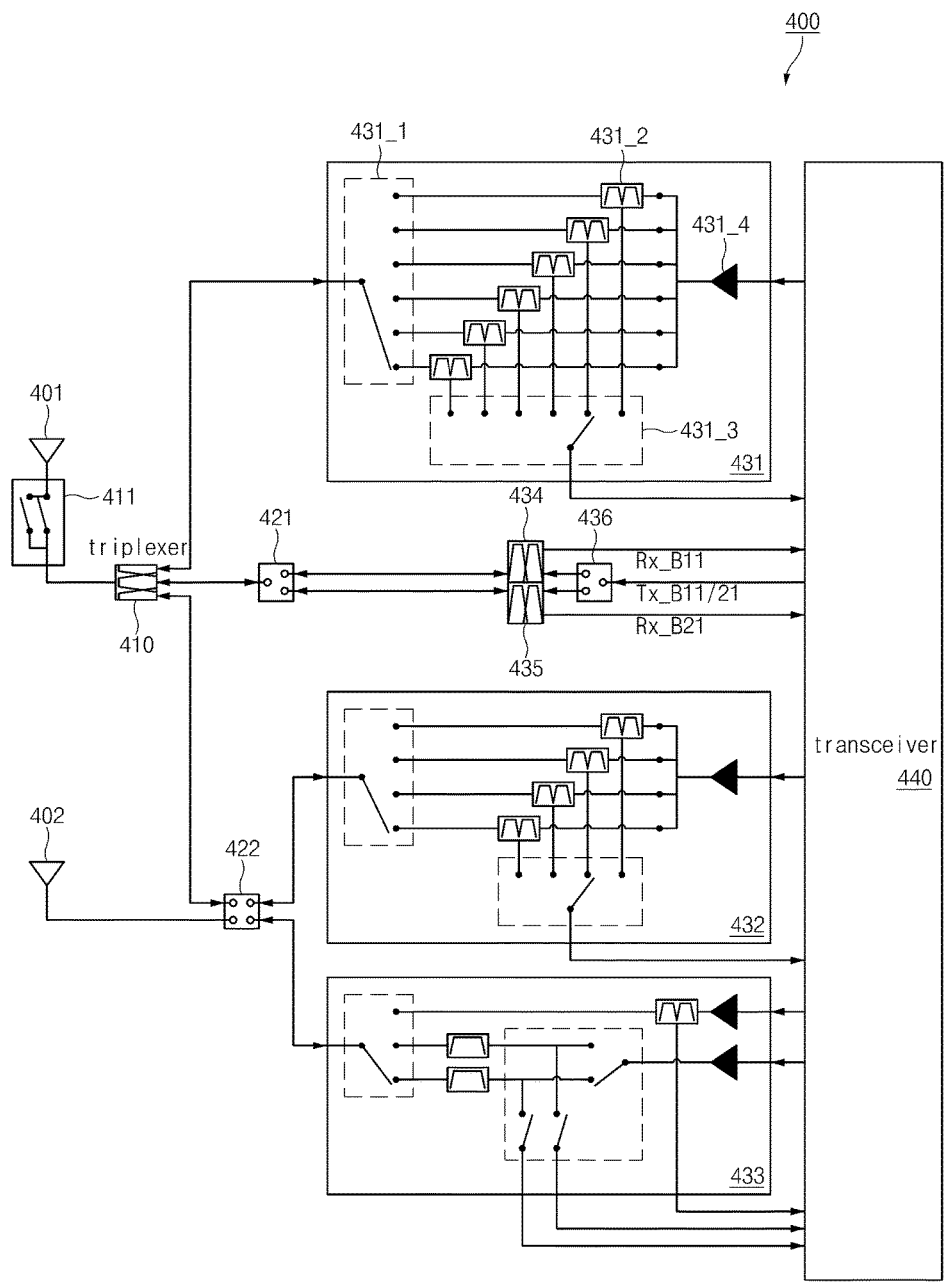
FIG. 4 illustrates an antenna structure of an electronic device according to another embodiment of the present disclosure.

FIG. 4 illustrates an antenna structure of an electronic device according to another embodiment of the present disclosure.

Referring to FIG. 4, an electronic device 400 may include a first antenna element 401, a second antenna element 402, a power feeding switch 411, a triplexer 410, a first switch 421, a second switch 422, a first RF block 431, a second RF block 432, a third RF block 433, duplexers 434 and 435, a third switch 436, and a transceiver 440. The electronic device 400 may be understood as an electronic device 100 of FIG. 1 or an electronic device 300 of FIG. 3, particularly, a detailed block diagram of the electronic device 300. Thus, the first antenna element 401, the second antenna element 402, the triplexer 410, the first switch 421, the second switch 422, the first RF block 431, the second RF block 432, and the third RF block 433 may correspond to the first antenna element 301, second antenna element 302, triplexer 310, first switch 321, second switch 322, LB RF block 331, MB RF block 332, and HB RF block 333 of FIG. 3, respectively. The power feeding switch 411 may correspond to the switch 251 of FIG. 2B, and the transceiver 440 may correspond to the transceiver 140 of FIG. 1. Thus, a description thereof will be omitted.

Each RF block may include a switch, a power amplifier module (PAM), a low noise amplifier (LNA), various filters, and a duplexer. For example, the first RF block 431 may include switches 431-1 and 431-3, a duplexer 431-2, and a power amplifier 431-4. For example, the first antenna element 401 may transmit and receive a signal corresponding to 700 to 900 MHz and 1.4 to 2.2 GHz or a signal corresponding to 700 to 900 MHz and 2.2 to 2.7 GHz. A signal corresponding to 700 to 900 MHz in the transmitted and received signal may be filtered by the triplexer 410 and may then be provided to the first RF block 431, which may control the switches 431-1 and 431-2 to be connected with a specific band, such as band 5, depending on settings of a band available or preferred in the electronic device 400 among bands 5, 12, 13, 14, 17, and 18, corresponding to the above frequency range. The settings of the band may vary according to a country where the electronic device 400 is located, or an operator of a network connected by the electronic device 400, for example. If the country or a mobile network operator (MNO) where the electronic device 400 is located is changed, the switches 431-1 and 431-3 may be connected with another port (band).

In an FDD communication mode, since frequency ranges used for transmission and reception differ from each other in the same band, a duplexer is needed for each band. Thus, the duplexer 431-2 may be located between the power amplifier 431-4 and the switch 431-1 for each band in the first RF block 431.

In a TDD communication mode, although a duplexer is not required because the same frequency is used in transmission and reception, a switch circuit should be used to separate transmission from reception. For example, the third RF block 433 may support three bands. One of the three bands may correspond to an FDD band connected with an amplifier and a switch via a diplexer, and two of the 3 bands may correspond to TDD bands.

Each of the RF modules 431 to 433 may be selectively connected according to a band which uses an antenna and a diplexer via a switch in a module. When transmitting a signal, a diplexer may transmit a Tx signal provided from a power amplifier to an antenna element 401 via a switch 431-1. An Rx signal passing through a diplexer may be transmitted to the transceiver 440 via another switch 431-3.

The transceiver 440 may convert the received signal into a baseband signal or may generate a transmission signal by converting a baseband signal into an RF band signal. The generated transmission signal may be provided to a power amplifier, may be amplified by the power amplifier, and may be transmitted to a network via an antenna element.

According to an embodiment, the triplexer 410 may isolate a signal corresponding to bands 11 and 21 from a signal received by the first antenna element 401. For example, the electronic device 400 may allow the first switch 421 to connect the triplexer 410 with the diplexer 434 of band 11 or with the diplexer 435 of band 21, depending on network settings. Signals passing through the diplexers 434 and 435 may be converted into baseband signals in the transceiver 440. The electronic device 400 may enable the switch 436 to be connected with the diplexer 434 or the diplexer 435 according to whether the transceiver 440 transmits a signal of band 11 or band 21.

Figure 5:
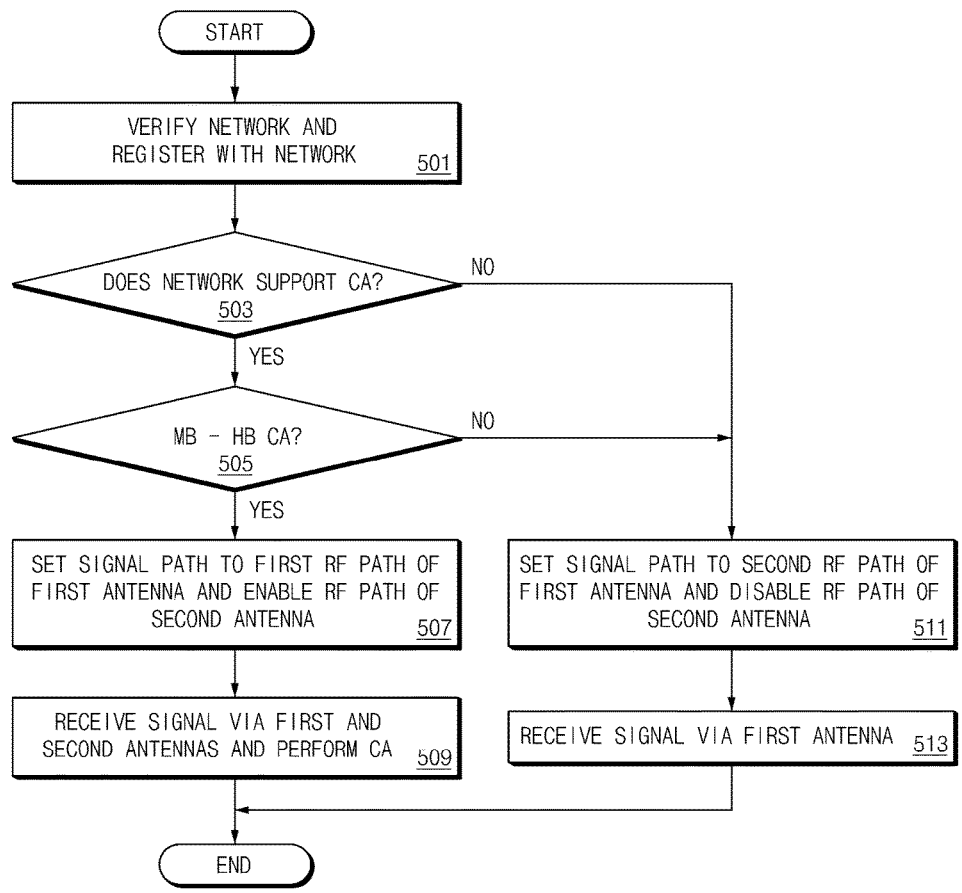
FIG. 5 illustrates an operation of controlling an antenna according to an embodiment of the present disclosure.

FIG. 5 illustrates an operation of controlling an antenna according to an embodiment of the present disclosure.

Hereinafter, it is assumed that an electronic device 100 of FIG. 1 performs a process of FIG. 5. However, those skilled in the art will recognize that the same description may be applied to an electronic device 300 of FIG. 3 and an electronic device 400 of FIG. 4. In the description of FIG. 5, an operation described as being performed by the electronic device 100 may be understood as being controlled by a CP 150 of the electronic device 100.

Referring to FIG. 5, in operation 501, the electronic device 100 may verify a network accessible or connected by the electronic device 100, and may register with the network.

In operation 503, the electronic device 100 may determine whether the network supports CA, such as based on a system information block (SIB) transmitted from the network. If the network does not support CA, in operation 511, the electronic device 100 may set a signal path of a first antenna element 101 of FIG. 1 to a second RF path corresponding to a frequency band supported by the network. For example, the electronic device 100 may change a radiator, to which power is fed, using a switch 251 in FIG. 2B or may change a ground location of a first antenna element 101 in FIG. 2A, and may set a second RF path.

In operation 511, the electronic device 100 may disable an RF path of a second antenna element 102 of FIG. 1. For example, the CP 150 may open a path between the second antenna element 102 and a transceiver 140 of FIG. 1 using a switch 120 of FIG. 1. Alternatively, the CP 150 may not feed power to the second antenna element 102.

In operation 513, the electronic device 100 may receive a signal using the first antenna element 101.

If it is determined in operation 503 that the network supports the CA, in operation 505, the electronic device 100 may determine whether the network supports MB-HB CA. For example, if CA supported by the network corresponds to intra-band CA or if CA supported by the network corresponds to inter-band CA based on signals simultaneously receivable via the first antenna element 101, the electronic device 100 may perform operation 511 described above. Herein, the signals simultaneously receivable via the first antenna element 101 may meet quality of at least a constant level.

For example, although the first antenna element 101 receives MB and HB signals, if it is difficult to isolate the MB and HB signals or if quality of a signal is decreased to a constant level or less because a considerable loss occurs when the MB and HB signals are isolated, the electronic device 100 may receive MB and HB signals via the second antenna element 102.

In the present disclosure, although MB-HB CA is described, there may be another CA combination which may not be received via the first antenna element 101 and may be received using the second antenna element 102. For example, in band 1+ band 5 CA (MB+LB), if it is possible for the first antenna element 101 to simultaneously receive a signal of band 1 and band 5, the electronic device 100 may receive the signal of band 1 using the second antenna element 102. Therefore, operation 505 may become an operation for determining whether the CA supported by the network is CA based on a plurality of bands which are not received via the first antenna element 101.

In operation 507, to receive a signal of a frequency band for CA, the electronic device 100 may set a signal path of the first antennal element 101 to a first RF path and may enable an RF path of the second antenna element 102. For example, in operation 509, the electronic device 100 may receive an LB signal and an MB signal including a first carrier component (CC) via the first antenna element 101 and may receive an HB signal including a second CC via the second antenna element 102. A transceiver 140 of FIG. 1 may perform CA using the first CC and the second CC.

Figure 6:
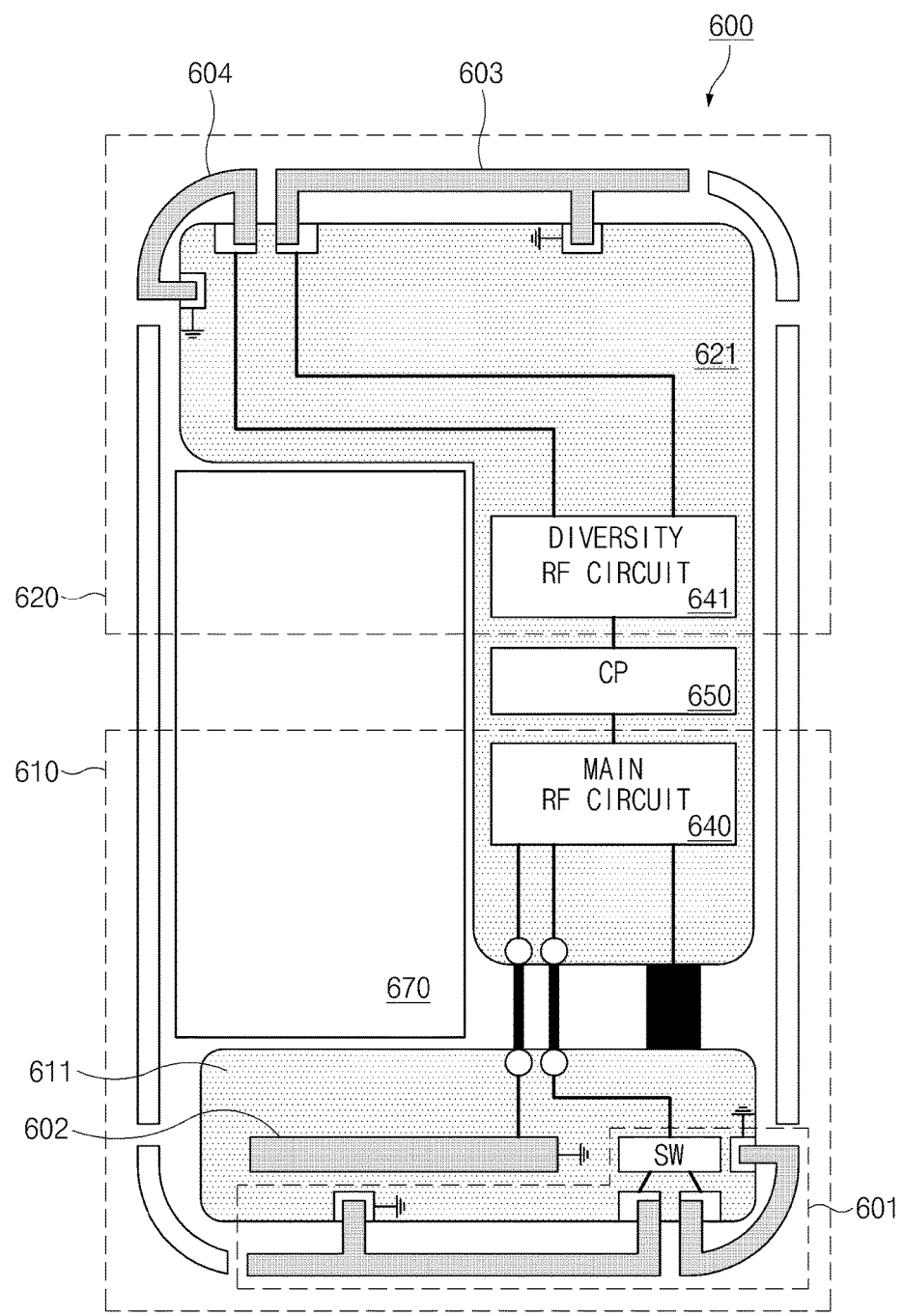
FIG. 6 illustrates hardware elements of an electronic device according to an embodiment of the present disclosure.

FIG. 6 illustrates hardware elements of an electronic device according to an embodiment of the present disclosure.

Referring to FIG. 6, an electronic device 600 may include a CP 650, which may be implemented to be integrated with another processing module, such as an application processor (AP). For example, the CP 650 may be implemented in a system on chip (SoC).

The CP 650 may be electrically connected with a radio frequency integrated circuit (RFIC) and may control an operation of the RF circuit, such as a transceiver. It is understood that the RF circuit includes a variety of hardware elements, such as a power amplifier (PA) or a low noise amplifier (LNA), a filter, or a switch, for processing a signal received via an antenna element.

In FIG. 6, the RF circuit may include a main RF circuit 640 and a diversity RF circuit 641. However, in another embodiment, the electronic device 600 may include three or more RF circuits or may include one integrated RF circuit.

The main RF circuit 640 may be connected with antenna elements located on a lower end 610 of the electronic device 600. For example, the main RF circuit 640 may be electrically connected with a first antenna element 601 and a second antenna element 602 which may have an electrical length for receiving at least one frequency band. For example, the first antenna element 601 may receive a signal of a first frequency band and a second frequency band, and the second antenna element 602 may receive a signal of a third frequency band. In an embodiment, the first antenna element 601 and the second antenna element 602 may receive a signal of a specific frequency band in common. The electronic device 600 may perform MB-HB CA using a CC of an MB received via the first antenna element 601 and a CC of an HB received via the second antenna element 602. If a frequency range of the HB received via the second antenna element 602 overlaps a frequency range of the HB receivable via the first antenna element 601, the electronic device 600 may implement a 2Rx diversity function using a signal received in common via the first antenna element 601 and the second antenna element 602.

In an embodiment, the electronic device 600 may use a signal received via a third antenna element 603 and a fourth antenna element 604 located on its upper end 620 for diversity. If it is possible for the first to fourth antenna elements 601 to 604 to receive a signal of a specific frequency range in common, the electronic device 600 may implement a 4Rx diversity function.

The electronic device 600 may have a variety of antenna structures other than the example shown in FIG. 3. It may be sufficient for the electronic device 600 to have a plurality of antennas for implementing embodiments disclosed in the present disclosure. Embodiments are not limited to a device which has two antennas in each of an upper end and a lower end. For example, in FIG. 6, although the antenna elements 601 and 602 located on the lower end 610 and the antenna elements 603 and 604 located on the upper end 620 have a generally symmetric structure, a structure or location of each of some antenna elements may be suitably modified in consideration of other electronic components and a design of the electronic device 600 according to a frequency band to be received and a CA or diversity function to be implemented. In addition, an antenna structure variously changeable by those skilled in the art may be considered.

In FIG. 6, each of the first antenna element 601 and the second antenna element 602 may include part of a metal frame forming a housing of the electronic device 600, and may be extended to the inside of the electronic device 600. For example, the first antenna element 601 and the second antenna element 602 may be located on the lower end 610 of the electronic device 600, and the third antenna element 603 and the fourth antenna element 604 may be located on the upper end 620 of the electronic device 600.

The main RF circuit 640 may be connected with the first antenna element 601 and the second antenna element 602 via a switch. The diversity RF circuit 641 may be electrically connected with a sub-antenna for receiving a diversity signal of a main antenna and may process the diversity signal received from the sub-antenna. For example, the diversity RF circuit 641 may be electrically connected with the third antenna element 603 and the fourth antenna element 604. If the first antenna element 601 receives a signal of a first frequency signal and if the third antenna element 603 is a sub-antenna of the first antenna element 601, the third antenna element 603 may also receive a (diversity) signal of the first frequency band. According to an embodiment, when a 4Rx diversity operation in which four antennas receive a signal of the same frequency band is performed, if the first antenna element 601 is a main antenna which receives a signal of a first frequency band, the second antenna element 602, the third antennal element 603, and the fourth antenna element 604 may receive a diversity signal of the first frequency band.

The electronic device 600 may include a first PCB 611 and a second PCB 621. Various circuits and elements for processing a signal received from an antenna may be located on the first PCB 611 or the second PCB 621. In FIG. 6, the second antenna element 602 is located on the first PCB 611. However, in another embodiment, the second antenna element 602 may be located on a third PCB lower or higher than the first PCB 611 or an FPCB. The first PCB 611 and the second PCB 621 may be electrically connected with each other. The electronic device 600 may include a battery 670 to supply power to components located on a PCB and feed power to an antenna radiator.

Figure 7:
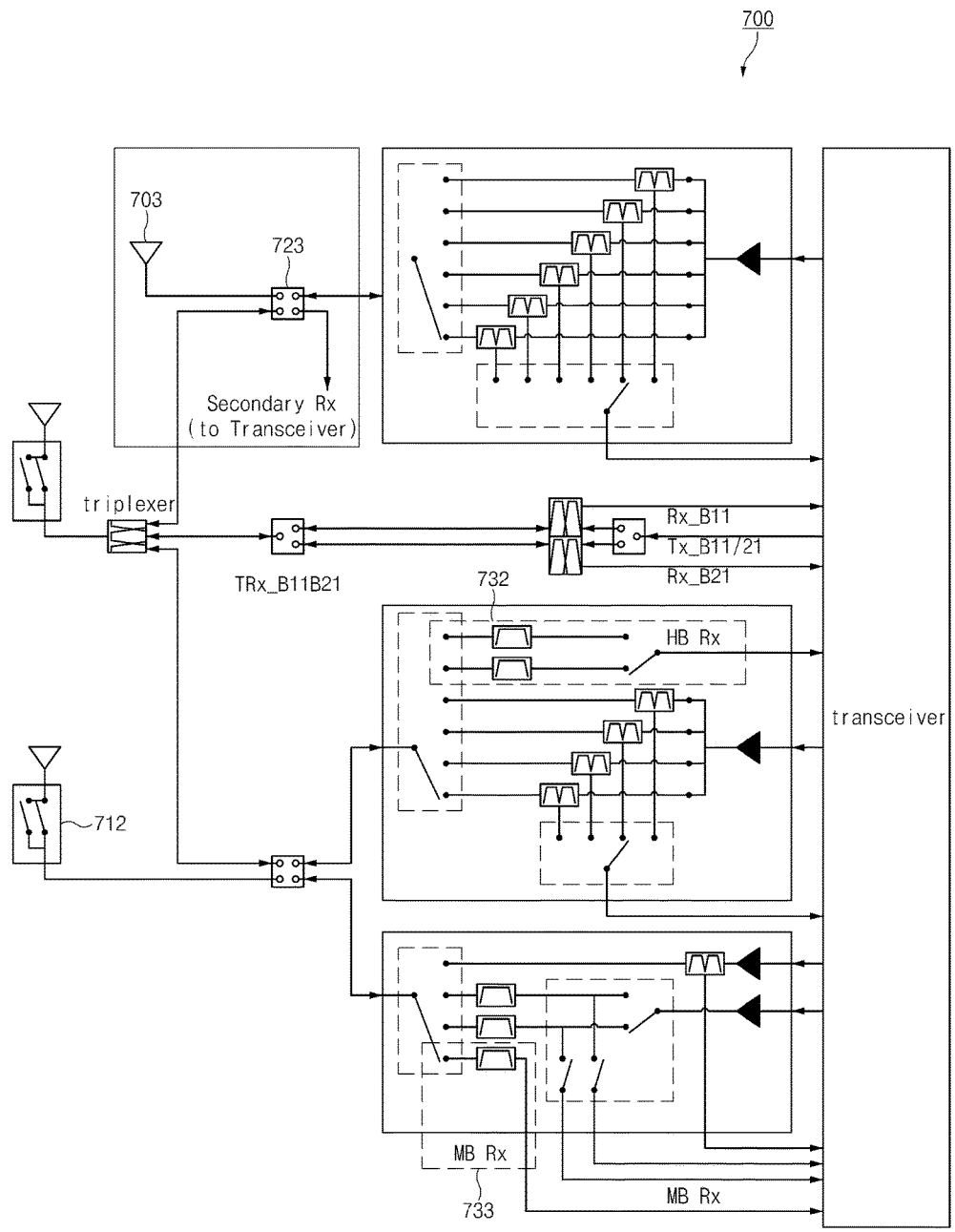
FIG. 7 illustrates an antenna structure of an electronic device for performing diversity according to an embodiment of the present disclosure.

FIG. 7 illustrates an antenna structure of an electronic device for performing diversity according to an embodiment of the present disclosure.

An electronic device 700 shown in FIG. 7 may be understood as a modification of an electronic device 400 shown in FIG. 4. Thus, details which are the same and similar to or correspond to a description described with reference to FIG. 4 will be omitted below, and will be described using the same reference numbers as those used in FIG. 4.

Referring to FIGS. 4 and 7, compared with the electronic device 400, the electronic device 700 may further include an HB block 732 for receiving an HB signal in a second RF block 432 and may further include an MB block 733 for receiving an MB signal in a third RF block 433. The electronic device 700 may further include a switching circuit 712 for receiving an MB signal other than an HB signal from a second antenna element 402.

The electronic device 700 may perform a CA operation, which may be performed in the electronic device 400, in the same manner. In addition, the electronic device 700 may further perform a diversity function by adding the HB block 732 and the MB block 733. For example, the electronic device 700 may receive an HB signal from a first antenna element 401. The received HB signal may be connected to a third RF block 433 via a second switch 422. In this case, referring to the same port structure as that of a second switch 322 of FIG. 3, the second switch 422 may connect port 1 with port 4. A CP 150 of FIG. 1 may control a switch structure 712 such that the second antenna element 402 receives an HB signal. The second switch 422 may connect port 2 with port 3. An HB signal received via the second antenna element 402 may be provided to the second RF block 432 via the second switch 422. Herein, the electronic device 700 may include the HB block 732 for processing an HB signal in the second RF block 432. An HB signal provided to the second RF block 432 may be provided to the HB block 732 through control of a switch in the second RF block 432. A transceiver 440 may receive a signal from the third RF block 433 and may receive a signal from the HB block 732, which both signals may be overlapped in certain frequency range.

The electronic device 700 may further include a third antenna element 703 and/or an additional antenna element. A signal received via the third antenna element 703 may be transmitted to the transceiver 440 or a separate transceiver, such as a diversity RF circuit 641 of FIG. 6, for processing a secondary Rx signal, via a switch structure 723. For example, if the third antenna element 703 receives a signal of a frequency range overlapped with the HB as described above, the electronic device 700 may implement 3Rx diversity. In a similar manner, if a fourth antenna element is included, the electronic device 700 may implement 4 Rx diversity.

If diversity using an MB signal is performed, the electronic device 700 may perform a similar operation as a diversity operation using the above-mentioned HB signal. For example, both of the first antenna element 401 and the second antenna element 402 may control switches to receive an MB signal, and the second switch 422 may connect port 1 with port 3 and may connect port 2 with port 4. In this case, the third RF block 433 may connect an MB signal input via port 4 to the MB block 733.

FIGS. 8A, 8B, 8C and 8D illustrate an antenna structure of a terminal according to embodiments of the present disclosure. A description of reference numbers will be omitted for elements repeated in FIGS. 8A, 8B, 8C and 8D.

Figure 8A:
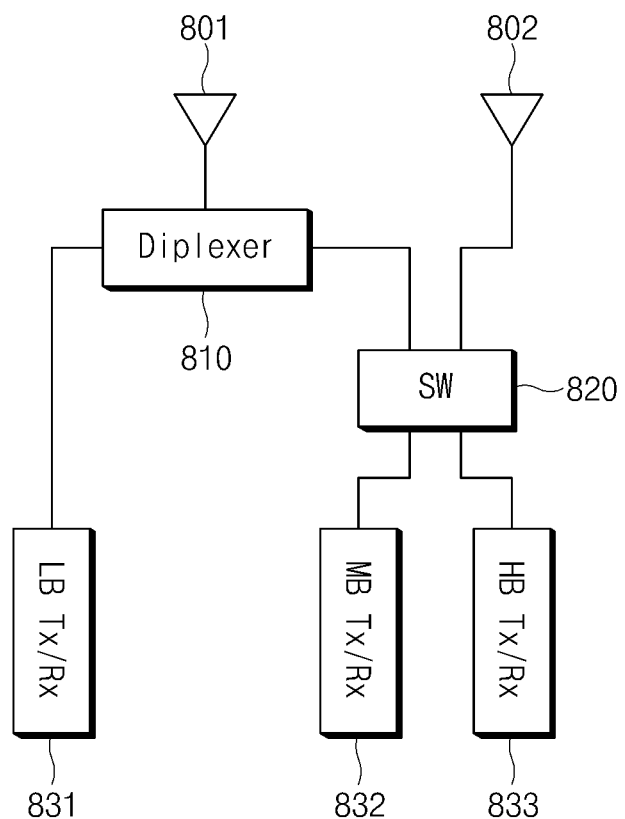
FIGS. 8A, 8B, 8C, and 8D illustrate an antenna structure of a terminal according to embodiments.

FIG. 8A illustrates an antenna structure for MB-HB CA according to an embodiment of the present disclosure. An MB signal received from a first antenna element 801 may be transmitted to an MB Tx/Rx block 832 via a switch (SW) 820. An HB signal received from a second antenna element 802 may be transmitted to an HB Tx/Rx block 833 via the SW 820. An LB signal received from the first antenna element 801 may be transmitted to an LB Tx/Rx block 831. A transceiver may perform MB-HB CA using the MB signal received from the MB Tx/Rx block 832 and the HB signal received from the HB Tx/Rx block 833.

According to an embodiment, when transmitting and receiving an HB signal, a terminal may compare Rx performance of signals according to states of the first antenna element 801 and the second antenna element 802, may select an antenna with relatively excellent Rx performance, such as signal quality and signal strength, as the SW 820, and may transmit and receive the HB signal. For example, performance of the second antenna element 802 may deteriorate due to a body contact of a user, such as a hand grip, in which case the terminal may compare performance of the first antenna element 801 with performance of the second antenna element 802 and may determine to convert an Rx antenna into an antenna with relatively excellent performance. This operation may be applied to FIGS. 8B and 8C, as well as FIG. 8A in a similar manner.

Figure 8B:
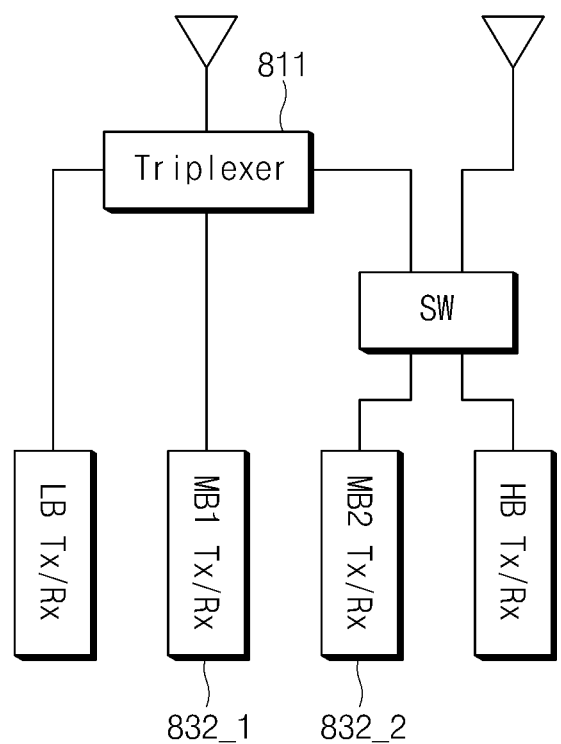

FIG. 8B illustrates an antenna structure for MB-HB CA according to another embodiment of the present disclosure. A signal received via the first antenna element 801 may be divided into an LB signal, a first MB signal MB1, and a second MB signal (MB2) via a triplexer 811. In this case, the first MB signal may be transmitted to an MB1 Tx/Rx block 832_1, and the second MB signal may be transmitted to an MB2 Tx/Rx block 832_2 via the SW 820. A transceiver may perform MB-HB CA using the second MB signal obtained from the MB2 Tx/Rx block 832_2 and an HB signal obtained from the HB Tx/Rx block 833.

Figure 8C:
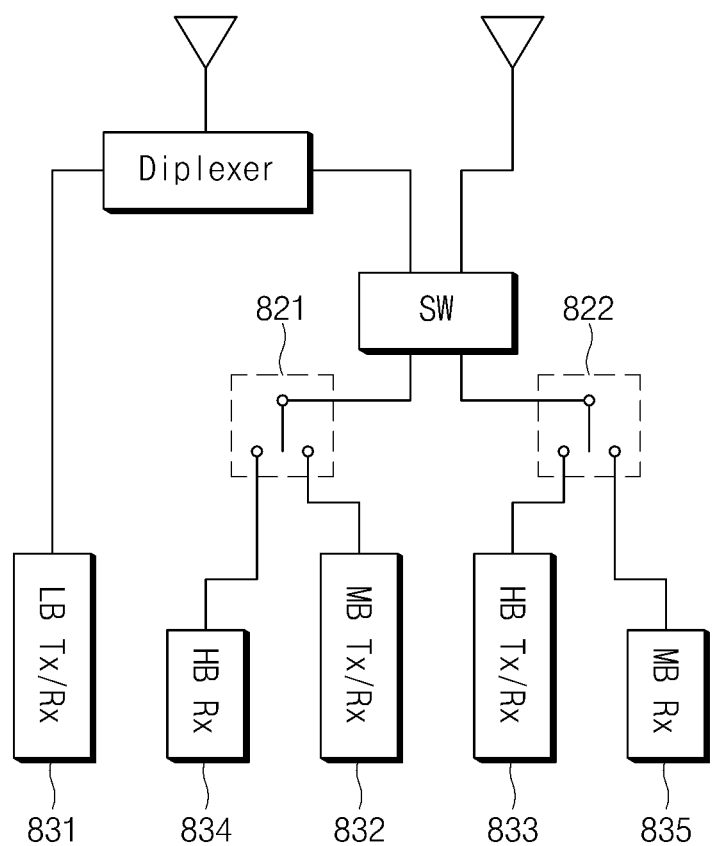

FIG. 8C illustrates an antenna structure for implementing MB-HB CA and diversity according to an embodiment of the present disclosure. In FIG. 8C, the second antenna element 802 may receive an MB signal other than an HB signal by a switch structure or the second antenna element 802.

A terminal may control a switch 821 and a switch 822 to perform MB-HB CA, an MB Rx diversity function, and an HB Rx diversity function. The terminal may perform MB-HB CA by connecting the switch 821 to an MB Tx/Rx block 832 and connecting the switch 822 to an HB Tx/Rx block 833. The terminal may perform an HB diversity function by connecting the switch 821 to an HB Rx block 834 and connecting the switch 822 to an HB Tx/Rx block 833. The terminal may perform an MB diversity function by connecting the switch 821 to the MB Tx/Rx block 832 and connecting the switch 822 to an MB Rx block 835.

Figure 8D:
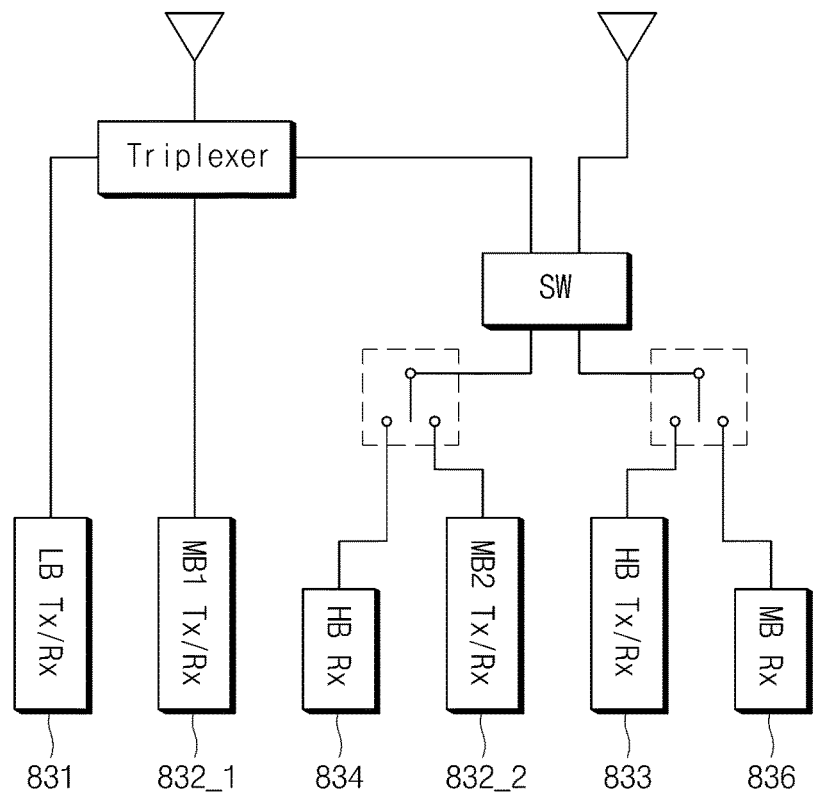

FIG. 8D illustrates an antenna structure for MB-HB CA and diversity according to an embodiment of the present disclosure, and may be understood as an example in which the embodiment of FIG. 8B is combined with the embodiment of FIG. 8C.

Figure 9:
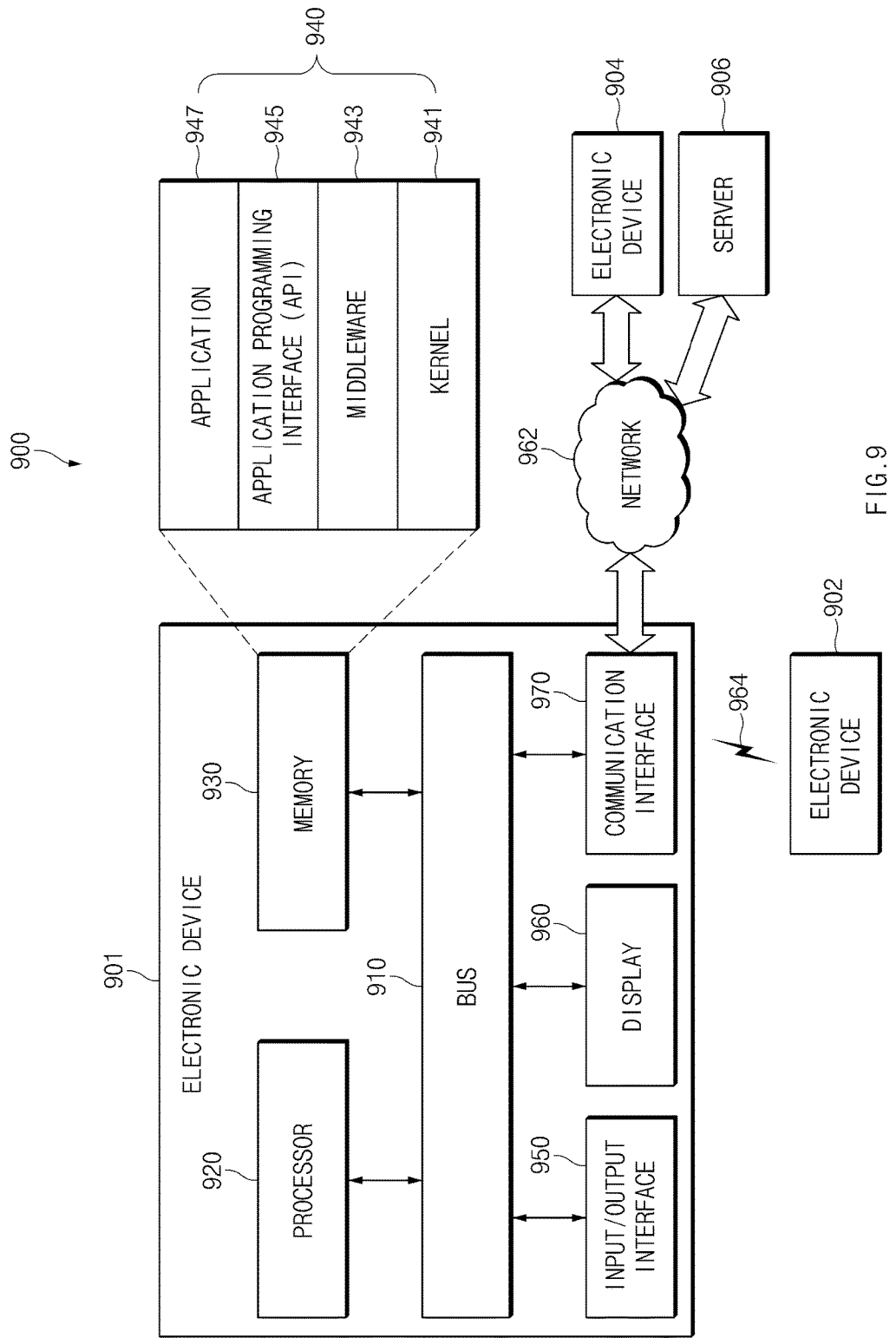
FIG. 9 illustrates an electronic device in a network environment, according to an embodiment of the present disclosure.

FIG. 9 illustrates an electronic device in a network environment 900, according to an embodiment of the present disclosure.

Referring to FIG. 9, an electronic device 901, a first electronic device 902, a second electronic device 904, and a server 906 may be connected with each other over a network 962 or a short range communication 964. The electronic device 901 may include a bus 910, a processor 920, a memory 930, an input/output interface 950, a display 960, and a communication interface 970. However, the electronic device 901 may not include at least one of the above-described elements or may further include other elements.

For example, the bus 910 may interconnect the above-described elements 910 to 970 and may include a circuit for conveying a control message and/or data among the above-described elements.

The processor 920 may include one or more of a CPU, an AP, and a communication processor (CP). For example, the processor 920 may perform an arithmetic operation or data processing associated with control and/or communication of at least other elements of the electronic device 901.

The memory 930 may include a volatile and/or nonvolatile memory. For example, the memory 930 may store instructions or data associated with at least one other element(s) of the electronic device 901. According to an embodiment, the memory 930 may store software and/or a program 940. The program 940 may include a kernel 941, a middleware 943, an application programming interface (API) 945, and/or application(s) 947. At least a part of the kernel 941, the middleware 943, or the API 945 may be referred to as an operating system (OS).

For example, the kernel 941 may control or manage system resources that are used to execute operations or functions of other programs, and may provide an interface that allows the middleware 943, the API 945, or the applications 947 to access discrete elements of the electronic device 901 so as to control or manage system resources.

The middleware 943 may perform a mediation role such that the API 945 or at least one of the applications 947 communicates with the kernel 941 to exchange data.

The middleware 943 may process one or more task requests received from at least one of the applications 947 according to a priority. For example, the middleware 943 may assign the priority, which enables use of a system resource of the electronic device 901, to at least one of the applications 947. The middleware 943 may process the one or more task requests according to the priority assigned to the at least one of the applications 947, which enables scheduling or load balancing on the one or more task requests.

The API 945 may be an interface through which the applications 947 control a function provided by the kernel 941 or the middleware 943, and may include at least one interface or function for file control, window control, image processing, or character control.

The input/output interface 950 may transmit an instruction or data input from a user or another external device, to other element(s) of the electronic device 901, and may output an instruction or data, received from other element(s) of the electronic device 901, to a user or another external device.

The display 960 may include a liquid crystal display (LCD), a light-emitting diode (LED) display, an organic LED (OLED) display, a microelectromechanical systems (MEMS) display, or an electronic paper display, may display various contents, such as a text, an image, a video, an icon, and a symbol, to a user and may include a touch screen that receives a touch, gesture, proximity, or hovering input using an electronic pen or a part of a user's body.

For example, the communication interface 970 may establish communication between the electronic device 901 and an external device and may be connected to the network 962 over wireless communication or wired communication to communicate with the external device.

The wireless communication may use at least one of long-term evolution (LTE), LTE advanced (LTE-A), code division multiple access (CDMA), wideband CDMA (WCDMA), universal mobile telecommunications system (UMTS), wireless broadband (WiBro), and global system for mobile communications (GSM), as a cellular communication protocol. The wireless communication may include the short range communication 964. The short range communication 964 may include at least one of wireless fidelity (Wi-Fi), Bluetooth®, near field communication (NFC), magnetic stripe transmission (MST), and a global navigation satellite system (GNSS).

The MST may generate a pulse in response to transmission data using an electromagnetic signal, and the pulse may generate a magnetic field signal. The electronic device 901 may transfer the magnetic field signal to point of sale (POS), which may detect the magnetic field signal using a MST reader and may recover the data by converting the detected magnetic field signal to an electrical signal.

The GNSS may include at least one of a global positioning system (GPS), a global navigation satellite system (Glonass), a Beidou navigation satellite system (Beidou), or a European global satellite-based navigation system (Galileo) based on an available region or a bandwidth. In this disclosure, "GPS" and "GNSS" may be interchangeably used. The wired communication may include at least one of a universal serial bus (USB), a high definition multimedia interface (HDMI), a recommended standard-232 (RS-232), and a plain old telephone service (POTS). The network 962 may include at least one of telecommunications networks a local area network (LAN) or wired area network (WAN), the Internet, and a telephone network.

Each of the first and second electronic devices 902 and 904 may be a type different from or the same as that of the electronic device 901. According to an embodiment, the server 906 may include a group of one or more servers. All or a portion of operations that the electronic device 901 will perform may be executed by another or plural electronic devices, such as the first electronic device 902, the second electronic device 904 or the server 906. When the electronic device 901 executes any function or service automatically or in response to a request, the electronic device 901 may not perform the function or the service internally, but instead, may request at least a portion of a function associated with the electronic device 901 at another electronic device, such as the electronic device 902 or 904 or the server 906. The other electronic device may execute the requested or additional function and may transmit the execution result to the electronic device 901, which may provide the requested function or service using the received result or may additionally process the received result to provide the requested function or service. To this end cloud computing, distributed computing, or client-server computing may be used.

Figure 10:
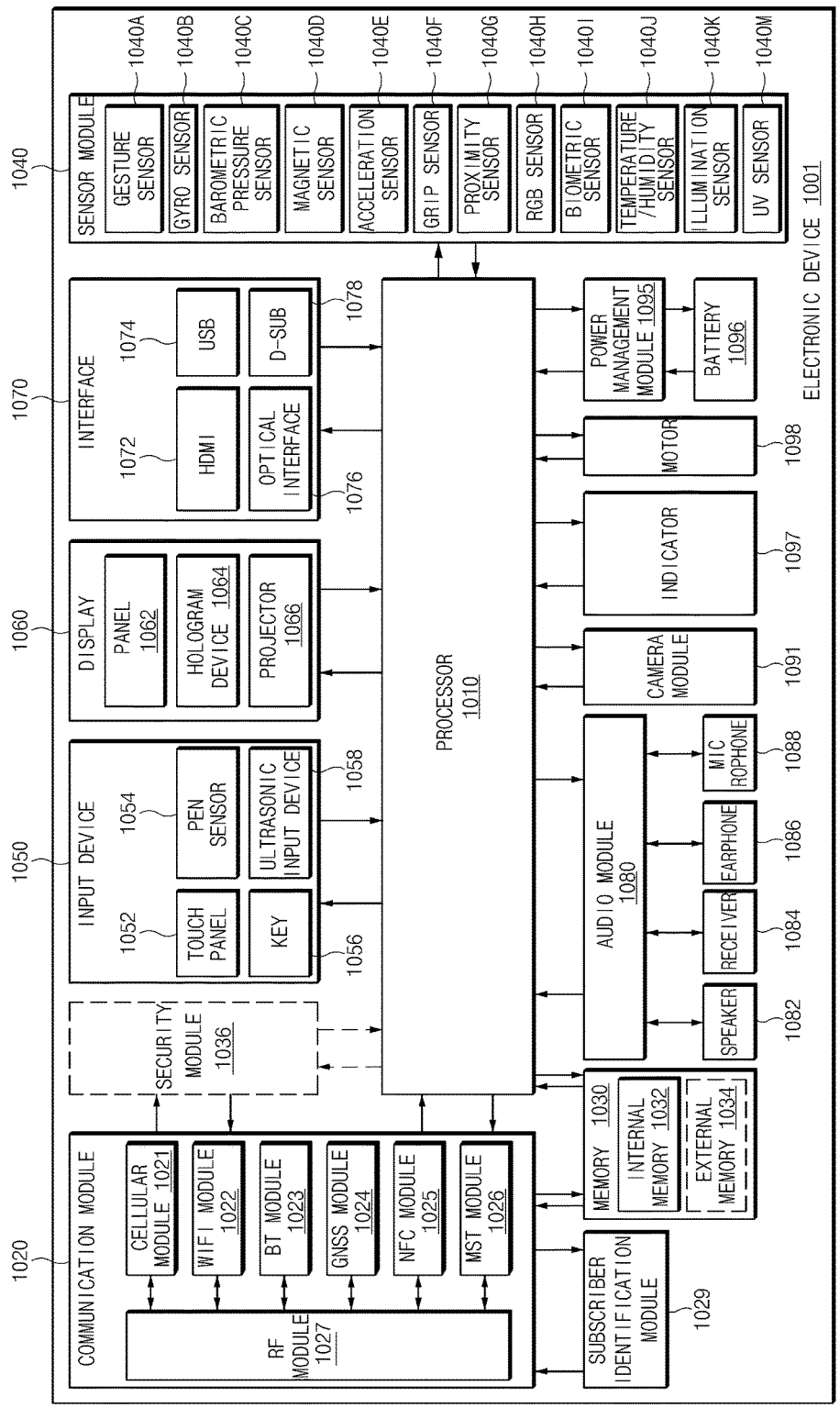
FIG. 10 illustrates a block diagram of an electronic device, according to an embodiment of the present disclosure.

FIG. 10 illustrates a block diagram of an electronic device, according to an embodiment of the present disclosure.

Referring to FIG. 10, an electronic device 1001 may include all or a part of the electronic device 901 illustrated in FIG. 9 and may include one or more processors, such as an AP 1010, a communication module 1020, a subscriber identification module (SIM) card 1029, a memory 1030, a sensor module 1040, an input device 1050, a display 1060, an interface 1070, an audio module 1080, a camera module 1091, a power management module 1095, a battery 1096, an indicator 1097, and a motor 1098.

The processor 1010 may drive an OS or an application to control a plurality of hardware or software elements connected to the processor 1010 and may process and compute a variety of data. For example, the processor 1010 may be implemented with a system on chip (SoC), may further include a graphic processing unit (GPU) and/or an image signal processor, and may include at least a part of elements illustrated in FIG. 10. The processor 1010 may load an instruction or data, which is received from at least one of other elements, such as a nonvolatile memory, into a volatile memory and process the loaded instruction or data, and may store a variety of data in the nonvolatile memory.

The communication module 1020 may be configured the same as or similar to the communication interface 970 of FIG. 9, and may include the cellular module 1021, a Wi-Fi module 1022, a Bluetooth (BT) module 1023, a GNSS module 1024, such as a GPS, Glonass, Beidou, or Galileo module, an NFC module 1025, a MST module 1026 and a radio frequency (RF) module 1027.

The cellular module 1021 may provide voice communication, video communication, a character service, and an Internet service over a communication network, may perform discrimination and authentication of the electronic device 1001 within a communication network by using the SIM card 1029, may perform at least a portion of functions that the processor 1010 provides, and may include a CP.

Each of the Wi-Fi module 1022, the BT module 1023, the GNSS module 1024, the NFC module 1025, and the MST module 1026 may include a processor for processing data exchanged through a corresponding module, for example, and at least two of these modules may be included within one integrated circuit (IC) or an IC package.

For example, the RF module 1027 may transmit and receive an RF signal, and may include a transceiver, a power amplifier module (PAM), a frequency filter, a low noise amplifier (LNA), and an antenna. According to another embodiment, at least one of the cellular module 1021, the Wi-Fi module 1022, the BT module 1023, the GNSS module 1024, the NFC module 1025, and the MST module 1026 may transmit and receive an RF signal through a separate RF module.

The SIM card 1029 may include a card and/or embedded SIM that includes a subscriber identification module and may include unique identify information, such as integrated circuit card identifier (ICCID), or subscriber information, such as international mobile subscriber identity (IMSI).

The memory 1030 may include an internal memory 1032 or an external memory 1034. For example, the internal memory 1032 may include at least one of a volatile memory, such as a dynamic random access memory (DRAM), a static RAM (SRAM), and a synchronous DRAM (SDRAM), a nonvolatile memory, such as a one-time programmable read only memory (OTPROM), a programmable ROM (PROM), an erasable and programmable ROM (EPROM), an electrically erasable and programmable ROM (EEPROM), a mask ROM, a flash ROM, a flash memory, such as a NAND flash memory or a NOR flash memory, a hard drive, or a solid state drive (SSD).

The external memory 1034 may further include a flash drive such as compact flash (CF), secure digital (SD), micro secure digital (Micro-SD), mini secure digital (Mini-SD), extreme digital (xD), a multimedia card (MMC), or a memory stick. The external memory 1034 may be operatively and/or physically connected to the electronic device 1001 through various interfaces.

A security module 1036 may include a storage space of which a security level is higher than that of the memory 1030 and may be ensure safe data storage and a protected execution environment. The security module 1036 may be implemented with a separate circuit and may include a separate processor, such as being in a removable smart chip or a secure digital (SD) card, or may include a secure element (eSE) embedded in a fixed chip of the electronic device 1001. The security module 1036 may operate based on an OS that is different from the OS of the electronic device 1001. For example, the security module 1036 may operate based on a Java card open platform (JCOP) OS.

The sensor module 1040 may measure a physical quantity or may detect an operation state of the electronic device 1001, may convert the measured or detected information to an electric signal, and may include at least one of a gesture sensor 1040A, a gyro sensor 1040B, a barometric pressure sensor 1040C, a magnetic sensor 1040D, an acceleration sensor 1040E, a grip sensor 1040F, the proximity sensor 1040G, a color sensor 1040H, such as a red, green, blue (RGB) sensor, a biometric sensor 1040I, a temperature/humidity sensor 1040J, an illuminance sensor 1040K, and an ultraviolet (UV) sensor 1040M. The sensor module 1040 may further include an E-nose sensor, an electromyography (EMG) sensor, an electroencephalogram (EEG) sensor, an electrocardiogram (ECG) sensor, an infrared (IR) sensor, an iris sensor, a fingerprint sensor, a control circuit for controlling at least one or more sensors included therein, and a processor that is a part of or independent of the processor 1010 and is configured to control the sensor module 1040. The processor 1010 may control the sensor module 1040 while the processor 1010 remains at a sleep state.

The input device 1050 may include a touch panel 1052, a (digital) pen sensor 1054, a key 1056, or an ultrasonic input unit 1058. For example, the touch panel 1052 may use at least one of capacitive, resistive, infrared and ultrasonic detecting methods, and may further include a control circuit and a tactile layer that provides a tactile reaction to a user.

The (digital) pen sensor 1054 may be a part of a touch panel or may include an additional sheet for recognition. The key 1056 may include a physical button, an optical key, or a keypad. The ultrasonic input device 1058 may detect (or sense) an ultrasonic signal, which is generated from an input device, through a microphone 1088 and may check data corresponding to the detected ultrasonic signal.

The display 1060 may include a panel 1062, a hologram device 1064, and a projector 1066. The panel 1062 may be the same as or similar to the display 960 illustrated in FIG. 9, and may be implemented to be flexible, transparent or wearable. The panel 1062 and the touch panel 1052 may be integrated into a single module. The hologram device 1064 may display a stereoscopic image in a space using a light interference phenomenon. The projector 1066 may project light onto a screen so as to display an image. For example, the screen may be arranged inside or outside of the electronic device 1001. According to an embodiment, the display 1060 may further include a control circuit for controlling the panel 1062, the hologram device 1064, and the projector 1066.

The interface 1070 may include a high-definition multimedia interface (HDMI) 1072, a universal serial bus (USB) 1074, an optical interface 1076, and a D-subminiature (D-sub) 1078, may be included in the communication interface 970 illustrated in FIG. 9, and may include a mobile high definition link (MHL) interface, a SD card/multi-media card (MMC) interface, or an infrared data association (IrDA) standard interface.

The audio module 1080 may convert a sound and an electric signal in dual directions. At least a part of the audio module 1080 may be included in the input/output interface 950 illustrated in FIG. 9. The audio module 1080 may process sound information that is input or output through a speaker 1082, a receiver 1084, an earphone 1086, or the microphone 1088.

For example, the camera module 1091 may shoot a still image or a video, and may include at least one or more image sensors, such as a front sensor or a rear sensor, a lens, an image signal processor (ISP), or a flash, such as an LED or a xenon lamp.

The power management module 1095 may manage power of the electronic device 1001. According to an embodiment, a power management integrated circuit (PMIC), a charger IC, or a battery gauge may be included in the power management module 1095. The PMIC may have a wired charging method and/or a wireless charging method. The wireless charging method may include a magnetic resonance method, a magnetic induction method or an electromagnetic method and may further include an additional circuit a coil loop, a resonant circuit, or a rectifier. The battery gauge may measure a remaining capacity of the battery 1096 and a voltage, current or temperature thereof while the battery is charged. The battery 1096 may include a rechargeable battery and/or a solar battery.

The indicator 1097 may display a specific state of the electronic device 1001 or a part thereof, such as a booting, message, and charging state. The motor 1098 may convert an electrical signal into a mechanical vibration and may generate vibration and haptic effects. A processing device, such as a GPU, for supporting a mobile TV may be included in the electronic device 1001 and may process media data according to the standards of digital multimedia broadcasting (DMB), digital video broadcasting (DVB), or Media-FLO™.

Each of the above-mentioned elements of the electronic device according to embodiments of the present disclosure may be configured with one or more components, and the names of the elements may be changed according to the type of the electronic device. In embodiments, the electronic device may include at least one of the above-mentioned elements, and some elements may be omitted or other additional elements may be added. Some of the elements of the electronic device according to embodiments may be combined with each other so as to form one entity, so that the functions of the elements may be performed in the same manner as before the combination.

Figure 11:
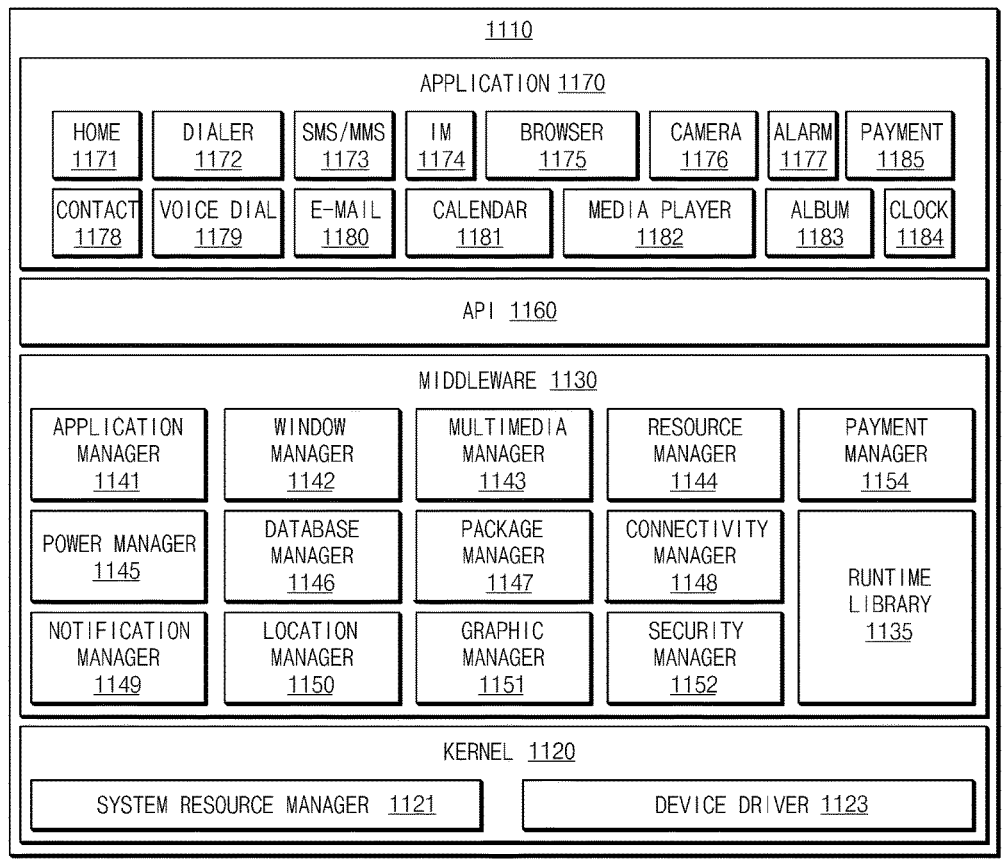
FIG. 11 illustrates a block diagram of a program module, according to embodiments.

FIG. 11 illustrates a block diagram of a program module, according to embodiments of the present disclosure.

According to an embodiment, a program module 1110 may include an OS to control resources associated with an electronic device, and/or diverse applications driven on the OS. The OS may be Android, iOS, Windows, Symbian, or Tizen.

The program module 1110 may include a kernel 1120, a middleware 1130, an application programming interface (API) 1160, and/or application(s) 1170. At least a portion of the program module 1110 may be preloaded on an electronic device or may be downloadable from an external electronic device, such as.

The kernel 1120 may include a system resource manager 1121 and a device driver 1123. The system resource manager 1121 may control, allocate, or retrieve system resources, and may include a process managing unit, a memory managing unit, or a file system managing unit. The device driver 1123 may include a display driver, a camera driver, a Bluetooth driver, a shared memory driver, a USB driver, a keypad driver, a Wi-Fi driver, an audio driver, or an inter-process communication (IPC) driver.

The middleware 1130 may provide a function that each of the applications 1170 needs in common, or may provide diverse functions to the applications 1170 through the API 1160 to allow the applications 1170 to efficiently use limited system resources of the electronic device. According to an embodiment, the middleware 1130 may include at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, a security manager 1152, and a payment manager 1154.

The runtime library 1135 may include a library module that is used by a compiler to add a new function through a programming language while at least one of the applications 1170 is being executed. The runtime library 1135 may perform input/output management, memory management, or capacities of arithmetic functions.

The application manager 1141 may manage a life cycle of at least one of the applications 1070. The window manager 1042 may manage a graphic user interface (GUI) resource that is used in a screen. The multimedia manager 1043 may identify a format necessary for playing diverse media files, and may perform encoding or decoding of media files by using a codec suitable for the format. The resource manager 1144 may manage resources such as a storage space, memory, or source code of at least one of the applications 1170.

The power manager 1045 may operate with a basic input/output system (BIOS) to manage a battery or power, and may provide power information for an operation of an electronic device. The database manager 1046 may generate, search for, or modify database that is to be used in at least one of the applications 1070. The package manager 1147 may install or update an application that is distributed as a package file.

The connectivity manager 1148 may manage wireless connection such as Wi-Fi or Bluetooth. The notification manager 1149 may display or notify an event such as arrival message, appointment, or proximity notification in a manner that does not disturb a user. The location manager 1150 may manage location information about an electronic device. The graphic manager 1151 may manage a graphic effect that is provided to a user or a user interface relevant thereto. The security manager 1152 may provide a general security function necessary for system security or user authentication. When an electronic device includes a telephony function, the middleware 1130 may further include a telephony manager for managing a voice or video call function of the electronic device.

The middleware 1130 may include a middleware module that combines diverse functions of the above-described elements, may provide a module specialized to each OS type to provide differentiated functions, and may dynamically remove a part of the preexisting elements or may add new elements thereto.

The API 1160 may be a set of programming functions and may be provided with a configuration that is variable depending on an OS. For example, when an OS is Android or iOS, the API 1160 may provide one API set per platform. When an OS is Tizen, the API 1160 may provide two or more API sets per platform.

The applications 1070 may include one or more applications capable of providing functions for a home 1171, a dialer 1172, an SMS/MMS 1173, an instant message (IM) 1174, a browser 1175, a camera 1176, an alarm 1177, a contact 1178, a voice dial 1179, an e-mail 1180, a calendar 1181, a media player 1182, an album 1183, a timepiece 1184, a payment 1185 application, or health care application for measuring an exercise quantity or blood sugar, or environmental information on barometric pressure, humidity, or temperature.

According to an embodiment, the applications 1070 may include an information exchanging application to support information exchange between an electronic device and an external electronic device. The information exchanging application may include a notification relay application for transmitting specific information to an external electronic device, or a device management application for managing the external electronic device.

For example, the notification relay application may include a function of transmitting notification information, which arises from other applications, to an external electronic device, and may receive notification information from an external electronic device and provide the notification information to a user.

The device management application may install, delete, or update at least one function, such as turn-on/turn-off of an external electronic device or a part of the device, or adjustment of brightness of a display of the external electronic device which communicates with the electronic device, an application running in the external electronic device, or a call or message service provided from the external electronic device.

The applications 1070 may include an application that is assigned in accordance with an attribute of an external electronic device, and an application that is received from an external electronic device, and may include a preloaded application or a third party application that is downloadable from a server. The names of elements of the program module 1110 according to the embodiment may be modifiable depending on types of operating systems.

According to embodiments, at least a portion of the program module 1110 may be implemented by software, firmware, hardware, or a combination of two or more thereof. At least a portion of the program module 1110 may be executed by the processor and may include modules, programs, routines, sets of instructions, or processes for performing one or more functions.

The term "module" used in this disclosure may represent a unit including one or more combinations of hardware, software and firmware, may be interchangeably used with the terms "unit", "logic", "logical block", "component" and "circuit", may be a minimum unit of an integrated component or a part thereof, may be a minimum unit for performing one or more functions or a part thereof, and may be implemented mechanically or electronically. For example, the "module" may include at least one of an application-specific IC (ASIC) chip, a field-programmable gate array (FPGA), and a programmable-logic device for performing some operations, which are known or will be developed in the future.

At least a part of an apparatus or a method according to embodiments may be implemented by instructions stored in a computer-readable storage media in the form of a program module. The instruction, when executed by a processor, may cause the one or more processors to perform a function corresponding to the instruction.

A computer-readable recording medium may include a hard disk, a floppy disk, a magnetic media, such as a magnetic tape, an optical media, such as a compact disc read only memory (CD-ROM) and a digital versatile disc (DVD), a magneto-optical media, such as a floptical disk), and hardware devices, such as a read only memory (ROM), a random access memory (RAM), or a flash memory. A program instruction may include not only a mechanical code such as things generated by a compiler but also a high-level language code executable on a computer using an interpreter. The above hardware unit may be configured to operate via one or more software modules for performing an operation of embodiments of the present disclosure, and vice versa.

A module or a program module according to embodiments may include at least one of the above elements, a part of the above elements may be omitted, or additional other elements may be further included. Operations performed by a module, a program module, or other elements according to embodiments may be executed sequentially, in parallel, repeatedly, or in a heuristic method. In addition, some operations may be executed in different sequences or may be omitted. Alternatively, other operations may be added.

According to embodiments of the present disclosure, the electronic device may implement inter-band CA using a signal of different frequency bands while sufficiently maintaining Rx performance of a signal.

The electronic device may enhance signal Rx performance of an antenna by using an antenna structure for implementing inter-band CA for Rx diversity.

In addition, various effects directly or indirectly ascertained through the present disclosure may be provided.

While the present disclosure has been shown and described with reference to embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
    a first antenna element configured to receive, selectively, (i) signals of a first frequency band and a second frequency band or (ii) signals of the first frequency band and a third frequency band;
    a second antenna element configured to receive a signal of the third frequency band;
    a transceiver configured to be electrically connected with the first antenna element and the second antenna element; and
    a processor configured to be electrically connected with the transceiver,
    wherein, if a network supports carrier aggregation (CA) using the second frequency and the third frequency band, the processor enables the first antenna element to receive the signals of the first frequency band and the second frequency band, enables the second antenna element to receive the signal of the third frequency band, and enables the transceiver to perform CA using the signal of the second frequency band and the signal of the third frequency band.

2. The electronic device of claim 1, wherein the first antenna element comprises a first radiator and a second radiator,
    wherein at least parts of the first radiator and the second radiator are positioned adjacent to each other to perform capacitive coupling feed to one of the first radiator and the second radiator when power is fed to the other of the first radiator and the second radiator, and
    wherein the first antenna element receives the signal of the first frequency band and the second frequency band when power is fed to the first radiator and receives the signal of the first frequency band and the third frequency band when power is fed to the second radiator.

3. The electronic device of claim 1, wherein the first antenna element is electrically connected with a first ground location and a second ground location, and
    wherein the first antenna element receives the signals of the first frequency band and the second frequency band when connected with the first ground location and receives the signals of the first frequency band and the third frequency band when connected with the second ground location.

4. The electronic device of claim 1, wherein the first antenna element comprises at least part of a metal housing of the electronic device.

5. The electronic device of claim 1, wherein the second antenna element is implemented as a flexible printed circuit board.

6. The electronic device of claim 5, wherein, if the network does not support CA, the processor does not receive a signal using the second antenna element.

7. The electronic device of claim 1, wherein, if the network does not support CA, the processor enables the first antenna element to receive the signals of the first frequency band and the second frequency or to receive the signals of the first frequency band and the third frequency band.

8. The electronic device of claim 1, wherein the second frequency band corresponds to 1930 to 1990 megahertz (MHz), and
    wherein the third frequency band corresponds to 2496 to 2690 MHz.

9. The electronic device of claim 1, wherein the first antenna element is configured to receive a signal using a first communication mode, and
    wherein the second antenna element is configured to receive a signal using a second communication mode.

10. The electronic device of claim 9, wherein the first communication mode corresponds to a frequency division duplex communication mode, and
    wherein the second communication mode corresponds to a time division duplex communication mode.

11. The electronic device of claim 1, wherein the processor is configured to:
    receive, if the network corresponds to the third frequency band, the signal of the third frequency band via the first antenna element; and
    receive a diversity signal of the third frequency band via the second antenna element.

12. The electronic device of claim 11, further comprising:
    a third antenna element and a fourth antenna element configured to receive the signal of the third frequency band,
    wherein the processor is configured to:
    receive, if the network corresponds to the third frequency band, a diversity signal of the third frequency band via the third antenna element and the fourth antenna element.

13. The electronic device of claim 1, wherein a signal of the second frequency band and the signal of the third frequency band are configured not to be simultaneously received by the first antenna element.

14. The electronic device of claim 1, wherein the processor determines whether the network supports CA based on a system information block received from the network.

15. The electronic device of claim 1, further comprising:
    a filter circuit configured to be connected with the first antenna element,
    wherein the filter circuit is configured to:
    isolate the signal of the first frequency band and the second frequency band or the third frequency band, the signal being received via the first antenna element.

16. An electronic device, comprising:
    a first antenna element;
    a first switch configured to enable the first antenna element to receive signals of a first frequency band and a second frequency band or to receive signals of the first frequency band and a third frequency band;
    a second antenna element configured to receive a signal of the third frequency band;
    a first radio frequency (RF) block configured to process a signal of the first frequency band;
    a second RF block configured to process a signal of the second frequency band;
    a third RF block configured to process the signal of the third frequency band;
    a second switch configured to connect the first antenna element with the second RF block or the third RF block according to a connection of the first switch and connect the second antenna element with third RF block according to whether a network supports carrier aggregation (CA);
    a transceiver configured to be connected with the first RF block, the second RF block, and the third RF block; and
    a processor configured to be electrically connected with the transceiver,
    wherein, if the network supports CA, the processor controls the first switch such that the first antenna element receives the signals of the first frequency band and the second frequency band, controls the second switch to connect the first antenna element with the second RF block and connect the second antenna element with the third RF block, and enable the transceiver to perform CA using the signal of the second frequency band and the signal of the third frequency band.

17. The electronic device of claim 16, further comprising:
a filter circuit configured to be electrically connected with the first antenna element,
wherein the filter circuit transmits the signal of the first frequency band, received via the first antenna element, to the first RF block and transmits the signal of the second frequency band or the third frequency band, received via the first antenna element, to the second switch.

18. The electronic device of claim 17, wherein the first antenna element is configured to:
enable, if the first switch is configured to receive the signal of the first frequency band and the second frequency band, the second switch to connect the filter circuit with the second RF block, and
wherein the first antenna element is configured to:
enable, if the first switch is configured to receive the signal of the first frequency band and the third frequency band, the second switch to connect the filter circuit with the third RF block.

19. The electronic device of claim 16, wherein the CA uses a first carrier component (CC) of the second frequency band and a second CC of the third frequency band.

20. The electronic device of claim 16, wherein, if the network does not support CA, the processor is configured to release a connection between the second antenna element and the third RF block by the second switch.

* * * * *